United States Patent
David et al.

(10) Patent No.: US 11,941,193 B2
(45) Date of Patent: Mar. 26, 2024

(54) WIRELESS UPLINK COMMUNICATION SYSTEM

(71) Applicant: Microsoft Technology Licensing, LLC, Redmond, WA (US)

(72) Inventors: Nir David, Tel Aviv (IL); Assaf Bar Ness, Ness Ziona (IL); Roei Avraham Halokhem, Herzliya (IL); Arie Yehuda Gur, Kiryat Ono (IL); Oren Istrin, Tel Aviv (IL); Anton Gorbanev, Kiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/066,466

(22) Filed: Dec. 15, 2022

(65) Prior Publication Data

US 2023/0418396 A1 Dec. 28, 2023

Related U.S. Application Data

(63) Continuation-in-part of application No. 17/808,504, filed on Jun. 23, 2022.

(51) Int. Cl.
*G06F 3/038* (2013.01)
*G06F 3/044* (2006.01)

(52) U.S. Cl.
CPC .......... *G06F 3/0383* (2013.01); *G06F 3/0442* (2019.05); *G06F 2203/0384* (2013.01)

(58) Field of Classification Search
CPC .............................. G06F 3/0383; G06F 3/0442
See application file for complete search history.

(56) References Cited

U.S. PATENT DOCUMENTS

| 9,569,041 B2 | 2/2017 | Son |
| 10,474,277 B2 | 11/2019 | Pant et al. |

(Continued)

FOREIGN PATENT DOCUMENTS

| CN | 109284018 A | 1/2019 |
| EP | 2650758 A1 | 10/2013 |

(Continued)

OTHER PUBLICATIONS

Hobbs, Por Jordan, "Microsoft's New Patent Exposure: Expected to Launch a Multi-Function Surface Pen", Retrieved from: https://mx.gearbest.com/blog/new-gear/microsofts-new-patent-exposure-expected-to-launch-a-multi-function-surface-pen-5408, May 30, 2019, 3 Pages.

(Continued)

*Primary Examiner* — Chun-Nan Lin
(74) *Attorney, Agent, or Firm* — Holzer Patel Drennan

(57) ABSTRACT

The disclosed technology controls a digital inking device by communicating electrostatic inking signals between the digital inking device and an ink-receiving computing device in an inking mode enabling the digital inking device to render digital ink in a display of the ink-receiving computing device via the electrostatic inking signals, detecting proximity of a peripheral communication device relative to the digital inking device, transitioning the digital inking device from the inking mode to a non-inking mode that terminates communication of the electrostatic inking signals between the digital inking device and the ink-receiving computing device, based at least in part on the detecting operation, and communicating electrostatic data signals in the non-inking mode between the digital inking device and the peripheral communication device in the non-inking mode, based at least in part on the transitioning to the non-inking mode.

20 Claims, 10 Drawing Sheets

(56) References Cited

U.S. PATENT DOCUMENTS

| | | | |
|---|---|---|---|
| 10,990,269 B2* | 4/2021 | Nomi | G06F 3/03545 |
| 11,048,360 B2* | 6/2021 | Jang | G06F 3/04166 |
| 11,204,655 B2* | 12/2021 | Gur | G06F 3/0446 |
| 11,269,428 B2* | 3/2022 | Geller | G06F 1/3231 |
| 2009/0260900 A1 | 10/2009 | Ure | |
| 2016/0006483 A1 | 1/2016 | Nishi | |
| 2017/0235560 A1 | 8/2017 | Mclean et al. | |
| 2018/0046269 A1* | 2/2018 | Kaplan | G06F 1/3259 |
| 2018/0129340 A1 | 5/2018 | Westhues et al. | |
| 2018/0246587 A1 | 8/2018 | Dekel | |
| 2019/0064941 A1 | 2/2019 | Westhues et al. | |
| 2019/0102021 A1* | 4/2019 | Jang | G06F 3/0383 |
| 2020/0073528 A1* | 3/2020 | Nomi | G06F 3/0487 |
| 2020/0081516 A1* | 3/2020 | Zyskind | G06F 3/04883 |
| 2020/0081560 A1* | 3/2020 | Geller | G06F 3/044 |

FOREIGN PATENT DOCUMENTS

| | | |
|---|---|---|
| WO | 2020209534 A1 | 10/2020 |
| WO | 2021067308 A1 | 4/2021 |

OTHER PUBLICATIONS

"International Search Report and Written Opinion Issued in PCT Application No. PCT/US23/021609", dated Sep. 4, 2023, 11 Pages.
"International Search Report and Written Opinion Issued in PCT Application No. PCT/US23/021611", dated Aug. 18, 2023, 13 Pages.

* cited by examiner

WIRELESS UPLINK COMMUNICATION SYSTEM

CROSS-REFERENCE TO RELATED APPLICATIONS

This application claims a benefit of priority and is a continuation-in-part of U.S. patent application Ser. No. 17/808,504, entitled "A WIRELESS UPLINK COMMUNICATION SYSTEM" and filed on Jun. 23, 2022, which is specifically incorporated by reference for all that it discloses and teaches.

BACKGROUND

User input devices such as styluses can be communicatively coupled with computing devices such as laptops. One communication method can be via electrostatic and/or electromagnetic communications between a transmitter of a digital inking device and an interface of a computing device. Such a connection can be used to exchange small amounts of data and facilitate ordinary use of the user input device with the computing device.

SUMMARY

The disclosed technology controls a digital inking device by communicating electrostatic inking signals between the digital inking device and an ink-receiving computing device in an inking mode enabling the digital inking device to render digital ink in a display of the ink-receiving computing device via the electrostatic inking signals, detecting proximity of a peripheral communication device relative to the digital inking device, transitioning the digital inking device from the inking mode to a non-inking mode that terminates communication of the electrostatic inking signals between the digital inking device and the ink-receiving computing device, based at least in part on the detecting operation, and communicating electrostatic data signals in the non-inking mode between the digital inking device and the peripheral communication device in the non-inking mode, based at least in part on the transitioning to the non-inking mode.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Digital inking devices (or other peripheral input devices that communicate electrostatically), such as styluses, can communicate with computing devices using different wireless communication signals. One type of wireless communication signal is electrostatic communication. Electrostatic communication can be used by a digital inking device (e.g., a stylus) to render digital ink via an electrostatic digitizer in a display.

Figure 1:
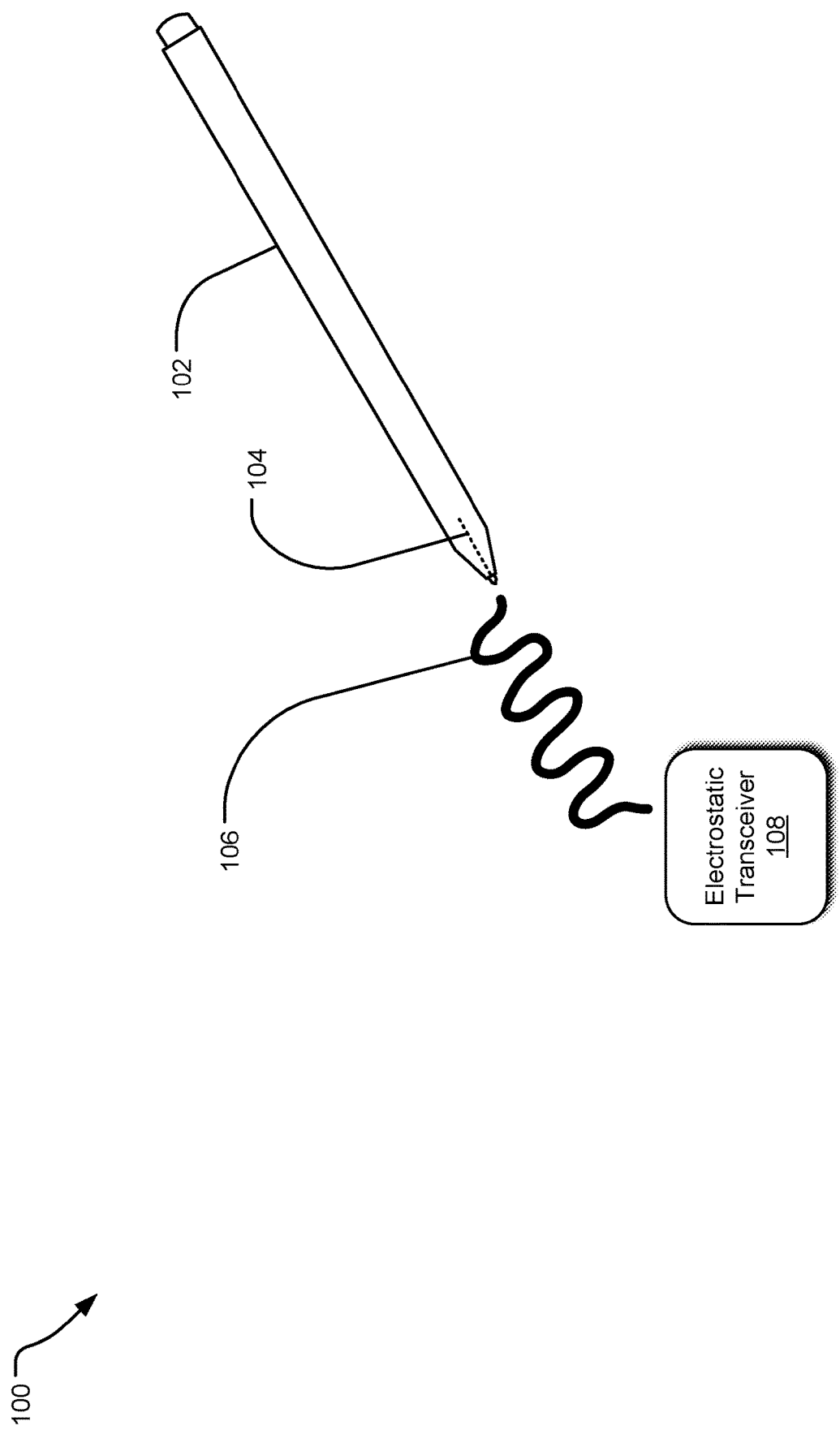
FIG. 1 illustrates an example system for communicating with a digital inking device.

FIG. 1 illustrates an example system 100 for communicating with a digital inking device 102. The digital inking device 102 includes an electrostatic electrode 104 that communicates an electrostatic communication 106 with an electrostatic transceiver 108. Examples of data exchanged in the electrostatic communication include inking data for applying digital ink to a display, telemetry data of the digital inking device 102, digital inking device 102 pen status data, or update data for updating the firmware of the digital inking device.

The digital inking device 102 can benefit from data maintenance communications, such as firmware updates or other communications during times the digital inking devices are not being used to apply digital ink to a display. During periods of non-use, the digital inking devices are positioned distally from a computing device (e.g., from the electrostatic transceiver, preventing electrostatic data communication or making the communication power intensive. For example, electrostatic communications are exchanged between digital inking devices and a digitizer of a display of a computing device when inking. When a user is done inking, the digital inking device is placed distally from the display. Also, some digital inking devices include batteries to power active components, including sensors and integrated circuits. When depleted, the batteries require charging. Charging cases or stations for digital inking devices can further obfuscate electrostatic signals.

Figure 2:
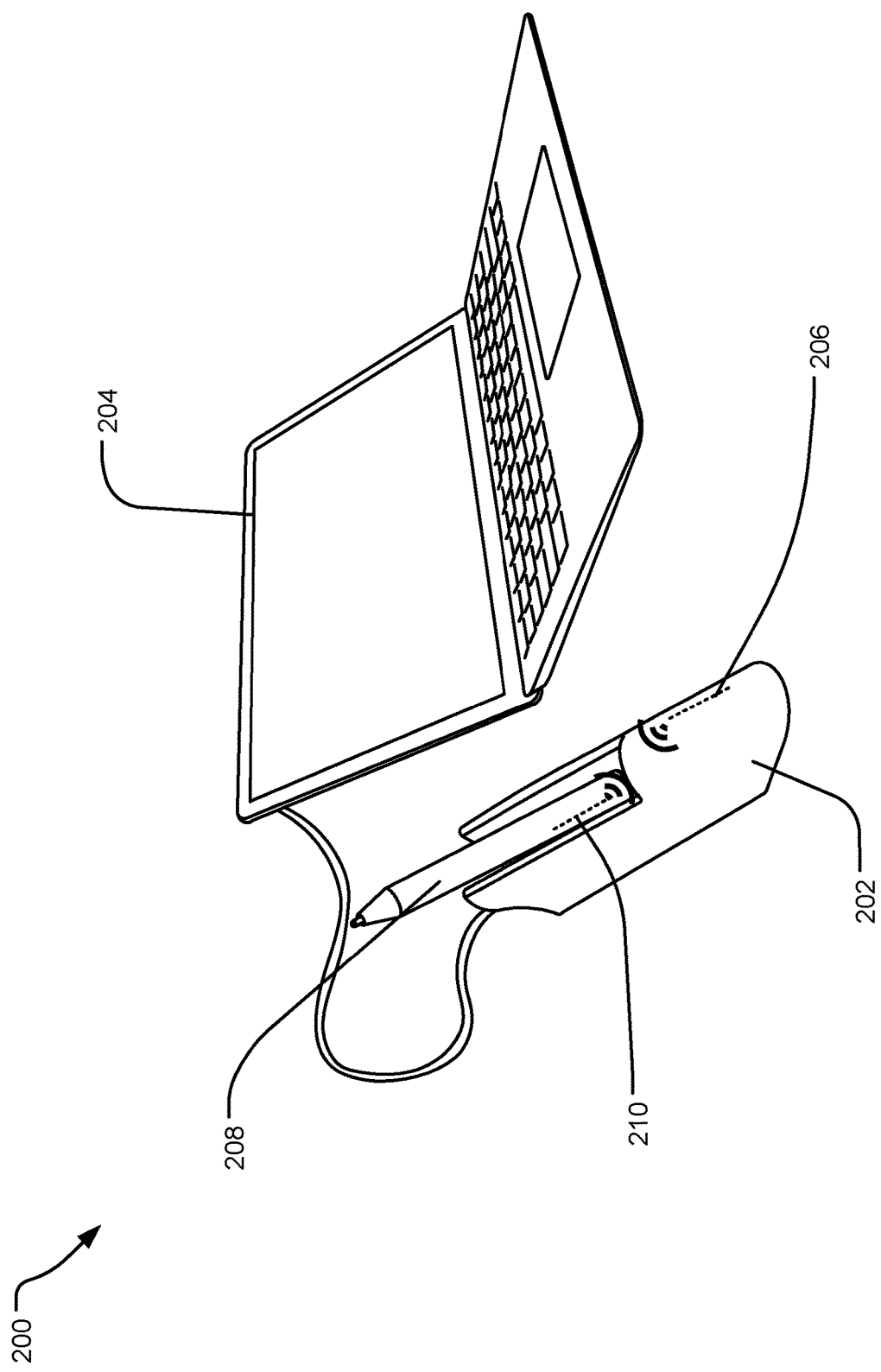
FIG. 2 illustrates an example system for controlling a digital inking device.
Figure 3:
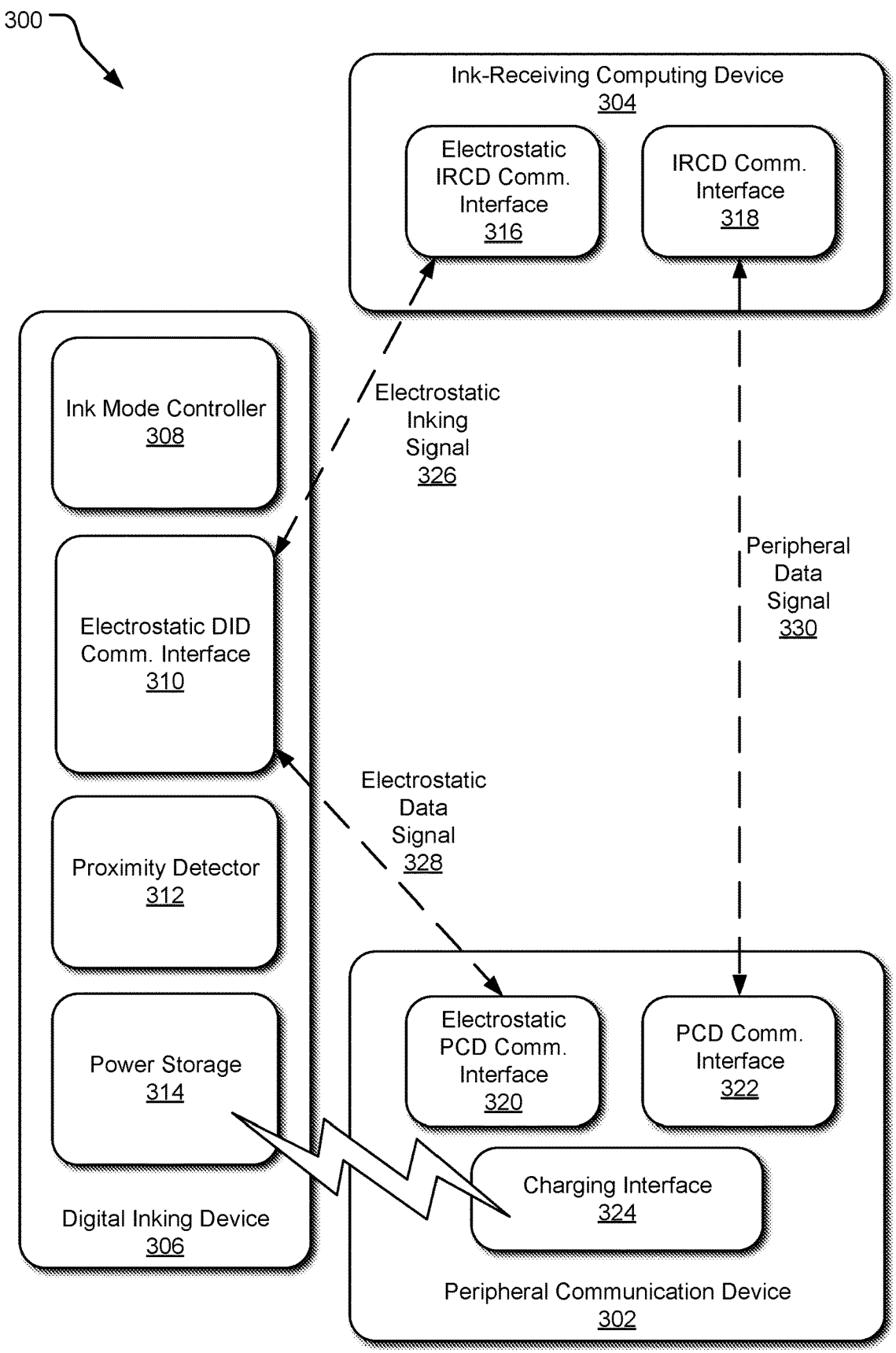
FIG. 3 illustrates an example electronics system for controlling a digital inking device.
Figure 4:
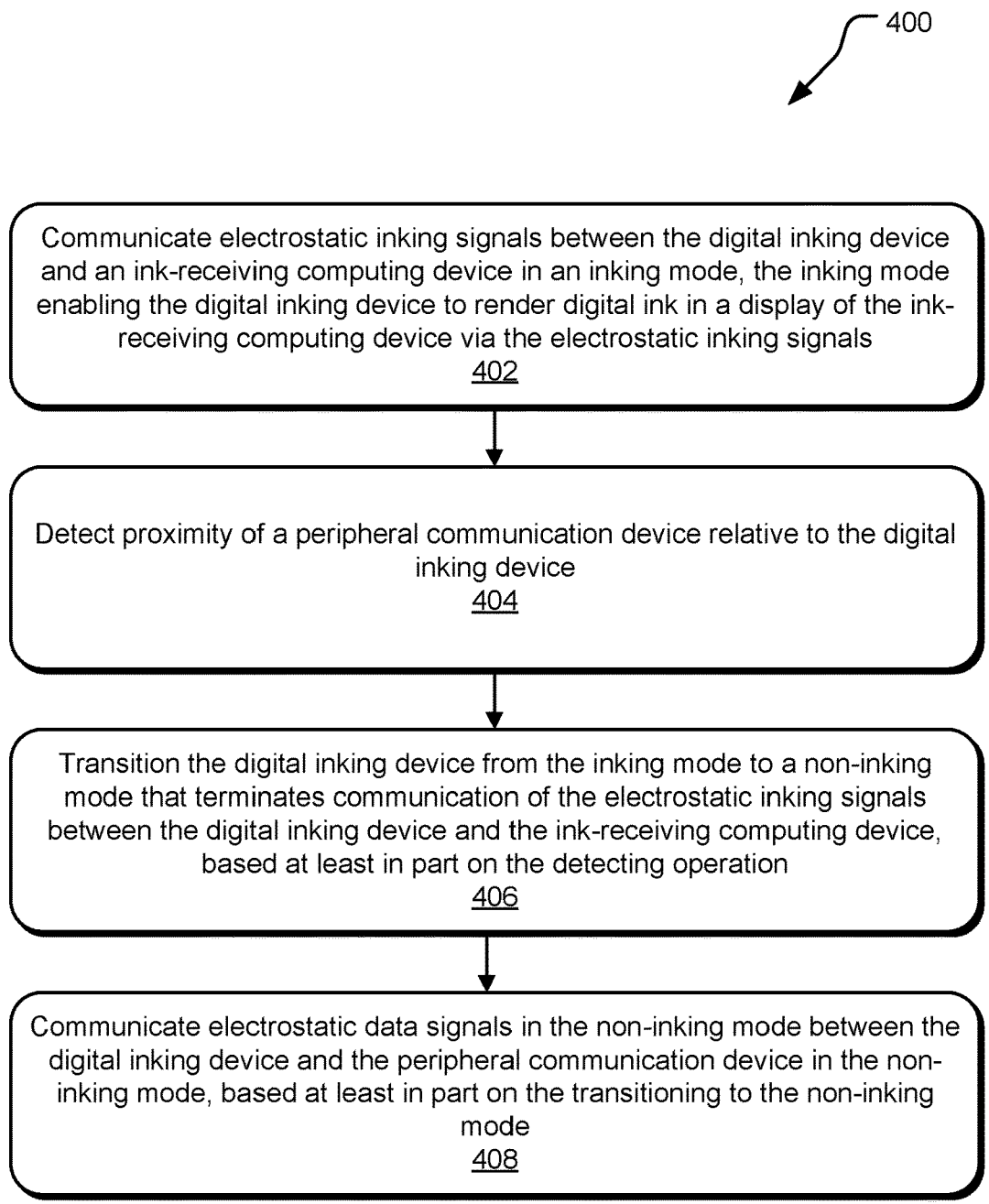
FIG. 4 illustrates example operations for controlling a digital inking device.

As illustrated and described with respect to FIGS. 2-4, the presently disclosed technology provides electrostatic communication between digital inking devices and a peripheral communication device, such as a docking station or charging case. The peripheral communication device can be in active or intermittent communication with a computing device to transmit data between the computing device to the digital inking device. In this manner, the digital inking device can receive clearer communications using less power and more efficient components in the digital inking device. For example, the digital inking device 102 can communicate more clearly with the electrostatic transceiver 108 in a case or docking station in which the digital inking device 102 is positioned because of proximity. Also, because the digital inking device 102 communicates via the electrostatic electrode 104 that is already used for inking, the charging hardware can be implemented without the need for additional communication hardware (e.g., Universal Serial Bus, near-field communication, or Bluetooth hardware) to communicate between the digital inking device 102 and the peripheral input device.

In an implementation, the digital inking device is configured to transition between inking modes and non-inking modes. In the inking mode, a significant portion of the communication bandwidth is dedicated to inking. In the non-inking mode, the communication can be dedicated exclusively to non-inking data, such as firmware updates, telemetry data, and pen status data. In implementations, the digital inking device communicates with the computing device or the peripheral communication device to the exclusion of the other at any given time.

Large updates to the firmware of the digital inking device 102 can be difficult to implement via the electrostatic communication 106 when the digital inking device 102 allocates bandwidth for inking and data communications that can limit the amount of electrostatic communication bandwidth allocated to the firmware updates. The firmware updates are transmitted from a computing device to the digital inking device 102. The electrostatic communication 106 is typically conducted over a lower bandwidth electrostatic channel. Even with the already limited bandwidth of the electrostatic communication 106 being further limited by other communications (e.g., the bandwidth allocated to inking signals), other non-inking communications for transmission between the digital inking device 102 and the electrostatic transceiver 108 can be communicated via the lower bandwidth electrostatic communications. The limited electrostatic communication bandwidth limits the ability of the digital inking device 102 to receive firmware updates electrostatically. Some implementations of the digital inking device 102 include alternative, higher bandwidth communication channels, such as Bluetooth channels, and these implementations of the digital inking device 102 can communicate firmware updates via the higher bandwidth channels. However, including dedicated hardware (e.g., Bluetooth or wireless USB interface hardware) to implement the alternative higher bandwidth communication channels in the digital inking device 102 increases the expense of the digital inking device 102.

While some larger updates can be transmitted intermittently (e.g., in chunks) between other multiuse commands via the lower bandwidth channels, the larger updates are hindered or even prevented by the lack of time in a communication cycle allocated to uplink blocks for uploading the large update. When communications are conducted over the lower bandwidth electrostatic channels, the communications may be conducted using a multiuse communication protocol. In a multiuse communication protocol used for both inking and updating firmware, a digitizer of a computing device may be configured to exchange information over the electrostatic connection to receive input from the digital inking device 102 to affect the operation of the computing device. For example, the digital inking device 102 may include a stylus for inking on a display of the computing device. In this example, the multiuse communication protocol may reserve portions of a communication cycle specifically for inking by the stylus. The synchronization and communication of these functions can occupy a significant portion of a communication cycle, leaving limited uplink blocks for uplinking data for an upload to the stylus. Also, because of the limited distance over which electrostatic or electromagnetic communication can be conducted from the digitizer, users may only place the user input device in sufficiently close proximity to the computing device for communication when the user is actively using the stylus, which may require that any communication be conducted using the multiuse communication protocol for seamless user operation.

While uploads conducted using the multiuse communication protocol may ensure seamless operation of the digital inking device 102 while any upload to the digital inking device 102 occurs, the small portion of the low bandwidth connection allocated by the multiuse communication protocol to uplink blocks for the upload may cause unreasonable delays in the upload or prevent the upload from completing.

As illustrated and described with respect to FIGS. 5-9, the presently disclosed technology transitions the communication protocols between a multiuse communication protocol and a dedicated uplink communication protocol for communications between the digitizer of the computing device and the digital inking device. The dedicated uplink communication protocol differs from the multiuse communication protocol in that communication between the computing device and the digital inking device using the dedicated uplink communication protocol is dedicated to uploading data in multiple consecutive uplink blocks from the digitizer to the digital inking device. By eliminating or limiting the communication of input from the digital inking device in a communication cycle, the electrostatic or electromagnetic communication from the digitizer can be dedicated to the upload of data from the computing device to the digital inking device. The dedication of the digitizer to the upload of data can expedite and help to ensure the completion of the upload.

In implementations, the wireless communications may continue to be conducted using the dedicated uplink communication protocol until an upload completion condition is satisfied. Satisfaction of the upload completion condition may be based at least in part on whether the digital inking device has confirmed that an upload has been completed. In implementations, while the communications are conducted using the dedicated uplink communication protocol, the digitizer may continuously or periodically transmit a signal indicating that the communications are being conducted by the dedicated uplink protocol. When the upload completion condition is satisfied, the digitizer may one or more of terminate the signal indicating that the communications are being conducted by the dedicated uplink protocol, generate a signal indicating that communications are being transitioned to using the multiuse communication protocol, and transition from using the dedicated uplink communication protocol to using the multiuse communication protocol.

In implementations, when the communications are being conducted using the dedicated uplink protocol, the digitizer may be configured to multicast the uplink data to more than one user input device. Unlike communications by larger bandwidth communication protocols (e.g., Bluetooth and wireless USB), which are tethered to specific user input devices, the communications using the dedicated uplink protocol can simultaneously provide the upload data to multiple devices via the electrostatic or electromagnetic communications from the computing device.

FIGS. 2-4 illustrate systems and operations for control of a digital inking device. Specifically, FIG. 2 illustrates an example system 200 for controlling a digital inking device. FIG. 2 includes a digital inking device 208. The digital inking device 208 includes an electrostatic electrode 210 configured to communicate electrostatically with an ink-receiving computing device 204 (e.g., via a digitizer in a display or trackpad) and/or with an electrostatic transceiver 206 of a peripheral communication device 202.

The peripheral communication device 202 holds, communicates with, and/or charges the digital inking device 208. As illustrated, the peripheral communication device 202 is a docking station. Other implementations of the peripheral communication device are contemplated, including a case for holding or storing the digital inking device 208 or a larger container for holding a plurality of digital inking devices. The peripheral communication device 202 is also directly communicatively coupled with the ink-receiving computing device 204.

When a user manipulates the digital inking device 208 to ink on a display of the ink-receiving computing device 204, the digital inking device 208 devotes electrostatic communication bandwidth to the inking signals. In implementations, the digital inking device 208 can operate in an inking mode and in a non-inking mode. The inking mode enables the digital inking device 208 to render digital ink in a display of the ink-receiving computing device 204. The non-inking mode terminates or disables electrostatic communication signals between the digital inking device 208 and the ink-receiving computing device 204 and/or terminates or disables inking functionality.

In an implementation, the digital inking device 208 detects its proximity to the peripheral communication device 202 and/or the ink-receiving computing device 204. Based at least in part on this detected proximity satisfying a proximity condition, the digital inking device 208 transitions from the inking mode to the non-inking mode. The proximity condition can include that digital inking device 208 is within a threshold distance or range of distances relative to the peripheral communication device 202 and/or the ink-receiving computing device 204. One or more technical benefits of detecting the proximity include providing an indication of a user's intention to stop inking and place the digital inking device 208 in a container for charging or otherwise.

In an implementation, the satisfaction of the proximity condition and or the transition from the inking mode to the non-inking mode causes the digital inking device 208 to communicate electrostatically with the peripheral communication device 202. The electrostatic transceiver 206 of the peripheral communication device 202 communicates electrostatic communications with the electrostatic electrode 210 of the digital inking device 208. In an implementation, the digital inking device 208 only directly communicates with the peripheral communication device 202 or the ink-receiving computing device 204 to the exclusion of the other at any given time. In an implementation, the digital inking device 208 communicates electrostatically with the ink-receiving computing device 204 in the inking mode and communicates electrostatically with the peripheral communication device 202 in the non-inking mode.

In implementations, despite the digital inking device 208 electrostatically communicating with the peripheral communication device 202 to the exclusion of the ink-receiving computing device 204 (e.g., in the non-inking mode), the ink-receiving computing device 204 can communicate with the digital inking device 208 via the peripheral communication device 202. In an implementation, the peripheral communication device 202 receives data to be transmitted to the digital inking device 208. In another implementation, the peripheral communication device 202 includes logic to operate on the data transmitted from the ink-receiving computing device 204, modifying or operating on the transmitted data to generate instructions or other data to communicate with the digital inking device 208.

The digital inking device 208 can include more than one electrostatic electrode (or antenna). As illustrated, the electrostatic electrode 210 is positioned on an eraser end (also referred to as a tail electrode) of the digital inking device 208. Implementations are contemplated in which the digital inking device 208, alternatively or additionally, includes an electrostatic electrode on the inking end (not illustrated, also called a tip electrode) opposite the eraser end and/or on a ring port located between the eraser end and the inking end.

In implementations, the peripheral communication device 202 includes charging hardware for charging a battery of the digital inking device. The charging interfaces can include wireless or physical connections. In implementations, because the digital inking device 208 and the peripheral communication device 202 communicate by wireless electrostatic communication, the charging interfaces can be physical without physical connections for data communication (e.g., via wired or physical Universal Serial Bus interface). In implementations, the digital inking device 208 is configured to enter a sleep mode when not in use (e.g., after a predefined idle time). In this implementation, if the digital inking device 208 is in communication with the peripheral communication device 202 (e.g., the digital inking device 208 is being charged by or is docked in the peripheral communication device 202), the digital inking device 208 deactivates, disables, or otherwise prevents the digital inking device 208 from entering the sleep mode. Preventing the digital inking device 208 from entering sleep mode facilitates quick data transfer between the digital inking device 208 and the peripheral communication device 202. In an implementation, the peripheral communication device 202 prevents the digital inking device 208 from entering the sleep mode during a data transfer between the peripheral communication device 202 and the digital inking device 208.

FIG. 3 illustrates an example electronics system 300 for controlling a digital inking device 306. The digital inking device 306 includes an ink mode controller 308 configured to transition the digital inking device 306 between an inking mode and a non-inking mode. For example, the digital inking device 306 is configured to communicate electrostatic inking signals 326 with an ink-receiving computing device 304 to render digital on a display of or a display in communication with the ink-receiving computing device 304 in the inking mode. When a user applies pressure to press the digital inking device 306 to the display, an electrostatic digital inking device communication interface 310 communicates the electrostatic inking signal 326 to render digital ink on the display. The electrostatic inking signals are communicated between an electrostatic digital inking device communication interface 310 of the digital inking device 306 and an electrostatic ink-receiving computing device communication interface 316.

When the user is finished inking, the user changes the proximity of the digital inking device 306 to a peripheral communication device 302. The digital inking device 306 includes a proximity detector 312 (e.g., including a sensor or element that interprets distances based on communicated electrostatic signals) configured to detect the proximity of the digital inking device to the peripheral communication device 302 and/or the ink-receiving computing device 304. The proximity detector 312 can determine whether the detected proximity satisfies a proximity condition. The proximity condition can include that digital inking device 306 is within a threshold distance or within a range of distances relative to the peripheral communication device 302 and/or the ink-receiving computing device 304. Implementations are also contemplated in which the proximity detector 312 is in the ink-receiving computing device 304 and/or the peripheral communication device 302 and transmits data representing proximity and/or a satisfaction of a proximity condition to the digital inking device 306.

In response to the proximity detector 312 determining that the detected proximity has satisfied a proximity condition, the ink mode controller 308 is configured to transition the digital inking device 306 from an inking mode to a non-inking mode. In the non-inking mode, the digital inking device 306 communicates an electrostatic data signal 328 with the peripheral communication device 302. Electrostatic communications between the digital inking device 306 and the peripheral communication device 302 are conducted between the electrostatic digital inking device communication interface 310 and an electrostatic peripheral communication device communication interface of the peripheral communication device 302. In an implementation, the digital inking device 306 only directly communicates electrostatically with one of the peripheral communication device 302 or the ink-receiving computing device 304 to the exclusion of the other at any given time. For example, in an implementation, the digital inking device 306 communicates electrostatically with the ink-receiving computing device 304 in the inking mode and communicates electrostatically with the peripheral communication device 302 in the non-inking mode.

The inking mode enables electrostatic inking signals, including inking signals dedicated to rendering digital ink on a display communicatively coupled with the ink-receiving computing device 304. The non-inking mode disables the electrostatic inking signals but maintains or enables electrostatic data signals 328. Unlike in the non-inking mode, in the inking mode, the system 200 further generates data regarding the pressure applied by a user to the digital inking device 208, processes system 200 identification data (e.g., digital inking device identifier, local identifier, host identifier, etc.), transmits data for haptic usage and/or transmits data from different antennas (e.g., a tip and/or tilt antenna) in order to estimate the orientation (e.g., angle, or position) of the digital inking device 208. In an implementation, in the non-inking mode, the digital inking device 208 exclusively transmits from a single antenna (e.g., a tip antenna) to conduct data transfer without a concern for the orientation of the digital inking device 208. Because the non-inking mode is dedicated to transfer of non-inking data, when the digital inking device 208 is in a non-inking mode, the digital inking device 208 can transmit large amounts of telemetry data that cannot pass during regular inking-mode protocols. One or more technical benefits of this is that the transfer of telemetry data can help adjust the pen setting more accurately for the users. The non-inking mode may also consume less power and may suffer less from false wakeups (which drain power). Also, using the electrostatic communication means in the digital inking device 208 to transmit this data can alleviate the need to install expensive communication hardware (e.g., Bluetooth, USB, NFC, etc.) in the digital inking device 208 in addition to the electrostatic communication equipment already used for digital inking.

Examples of the electrostatic data signal 328 include or represent telemetry data, update data, or pen status data. Telemetry data includes a digital inking device identifier (e.g., a pen ID). Update data includes firmware update data. In an implementation, the firmware update data may originate in the ink-receiving computing device 304, be communicated via the peripheral data signal 330 to the peripheral communication device, and then be transmitted via the electrostatic data signal 328 to the digital inking device 306. Alternatively, the peripheral communication device 302 can source the firmware update from a different source. Pen status includes the status of the charge of the digital inking device 306 power storage 314.

In an implementation, the inking mode allocates more portions of an update frame (e.g., a communication cycle) to inking data such as pressure data, position data, and other inking data to allow for low-latency inking via the electrostatic inking signal 326. The non-inking mode provides more uplink windows in the update frame than in the inking mode to allow for more non-inking data (e.g., firmware update data) to be exchanged in the electrostatic data signal 328.

In implementations, despite the digital inking device 306 electrostatically communicating with the peripheral communication device 302 to the exclusion of the ink-receiving computing device 304 (e.g., in the non-inking mode), the ink-receiving computing device 304 can communicate with the digital inking device 306 via the peripheral communication device 302. In these implementations, the peripheral communication device 302 communicates a peripheral data signal with the ink-receiving computing device 304 to be transmitted to the digital inking device 306. For example, the ink-receiving computing device 304 includes an ink-receiving computing device communication interface 318 (e.g., a non-electrostatic communication interface) configured to communicate (e.g., over a non-electrostatic wireless connection or over a wired connection) the peripheral data signal 330 with a peripheral communication device communication interface 322 (e.g., a non-electrostatic communication interface). In an implementation, the peripheral communication device 302 includes logic to operate on the data transmitted from the ink-receiving computing device 304, modifying or operating on the transmitted data to generate instructions or other data to communicate with the digital inking device 306.

In an implementation, the electrostatic digital inking device communication interface 310 can include more than one electrostatic antenna. For example, implementations are contemplated in which the digital inking device 306 includes an electrostatic electrode on a first end (e.g., a tip electrode for inking), an electrostatic electrode on a second end (e.g., a tail electrode for erasing), and/or an electrostatic electrode positioned between the first end and the second end (e.g., a ring electrode for relative positioning).

In implementations, the electrostatic antenna(s) or electrodes of the electrostatic peripheral communication device communication interface 320 can be positioned in multiple places, or a single antenna or electrode can extend substantially throughout the peripheral communication device 302. In an implementation in which the peripheral communication device 302 is a docking station or charging case, the antenna or electrode is positioned to be proximal to an end of the digital inking device 306 when positioned in the peripheral communication device 302. This can provide a clean electrostatic signal without boosting power to communicate the electrostatic data signal 328.

In implementations, the peripheral communication device 302 includes charging hardware for charging a battery of the digital inking device. As illustrated, the peripheral communication device includes a charging interface 324 in electric communication with the power storage 314 (e.g., a battery) of the digital inking device. The charging interface 324 can include wireless or physical connections. In implementations, because the digital inking device 306 and the peripheral communication device 302 communicate by wireless electrostatic communication, the charging interface 324 can be physical without also including physical connections for data communication (e.g., via Universal Serial Bus). This can reduce the hardware needed by the digital inking device 306, which makes the digital inking device cheaper and easier to manufacture. It also reduces the cost of the peripheral communication device that can rely on the electrostatic data signal 328 to communicate data with the digital inking device rather than an additional physical data connection (e.g., via Universal Serial Bus) or wireless data connection (e.g., via near-field communication or Bluetooth).

FIG. 4 illustrates example operations 400 for controlling a digital inking device. A communicating operation 402 communicates electrostatic inking signals between the digital inking device and an ink-receiving computing device in an inking mode. The inking mode enables the digital inking device to render digital ink in a display of the ink-receiving computing device via the electrostatic inking signals. The communicating operation 402 uses the digital inking device to communicate electrostatic inking signals with an ink-receiving computing device to render digital on a display of or a display in communication with the ink-receiving computing device in the inking mode. When a user applies pressure to press the digital inking device to the display, an electrostatic digital inking device communication interface communicates the electrostatic inking signal to render digital ink on the display. The electrostatic inking signals are communicated between an electrostatic digital inking device communication interface of the digital inking device and an electrostatic ink-receiving computing device communication interface. When the user is finished inking, the user changes the proximity of the digital inking device to a peripheral communication device.

A detecting operation 404 detects the proximity of a peripheral communication device relative to the digital inking device. The detection operation user a proximity detector (e.g., including a sensor or element that interprets distances based on communicated electrostatic signals) configured to detect the proximity of the digital inking device to the peripheral communication device and/or the ink-receiving computing device. The proximity detector can determine whether the detected proximity satisfies a proximity condition. The proximity condition can include that the digital inking device is within a threshold distance or within a range of distances relative to the peripheral communication device and/or the ink-receiving computing device. Implementations are also contemplated in which the proximity detector is in the ink-receiving communication device and/or the peripheral communication device and transmits data representing proximity and/or a determination of a satisfaction of a proximity condition to the digital inking device. In an implementation, the detecting operation is responsive to or based at least in part on the digital inking device being in the inking mode. Conducting the detection operation in the inking mode can provide one or more technical benefits including preventing the digital inking device from reducing or eliminating inking functionality until the user makes a gesture indicative of the user's desire to stop inking.

A transitioning operation 406 transitions the digital inking device from the inking mode to a non-inking mode that terminates communication of the electrostatic inking signals between the digital inking device and the ink-receiving computing device. The transitioning operation 406 is based, at least in part, on the detecting operation. The transitioning operation 406 uses an ink mode controller configured to transition the digital inking device between an inking mode and a non-inking mode. The non-inking mode disables or otherwise terminates the electrostatic inking signals but maintains or enables electrostatic data signals.

A communicating operation 408 communicates electrostatic data signals in the non-inking mode between the digital inking device and the peripheral communication device in the non-inking mode. The communicating operation 408 is based at least in part on the transitioning to the non-inking mode. For example, the communicating operation 408 is responsive to the detected proximity satisfying a proximity condition and/or responsive to the transitioning operation 406. Examples of the communicated electrostatic data signal include or represent telemetry data, update data, or pen status data. Telemetry data includes a digital inking device identifier (e.g., a pen ID). Update data includes firmware update data. In an implementation, the firmware update data may originate in the ink-receiving communication device, be communicated via the peripheral data signal to the peripheral communication device, and then be transmitted via the electrostatic data signal to the digital inking device. Alternatively, the peripheral communication device can source the firmware update from a different source. Pen status includes the status of the charge of the digital inking device power storage.

In an implementation, the inking mode allocates more portions of an update frame for inking data, such as pressure data, position data, or other inking data, to allow for low-latency inking via the electrostatic inking signal. The non-inking mode provides more uplink windows in the update frame than in the inking mode to allow for more non-inking data (e.g., firmware update data) to be exchanged in the electrostatic data signal. The non-inking mode may be similar to a hover state in which the digital inking device is far enough from the display that it will not be used. In the hover state, the digital inking device does not measure pressure data for inking. The non-inking mode disables or otherwise terminates the electrostatic inking signals but maintains or enables electrostatic data signals.

In implementations, despite the digital inking device electrostatically communicating with the peripheral communication device to the exclusion of the ink-receiving computing device (e.g., in the non-inking mode), the ink-receiving computing device can communicate with the digital inking device via the peripheral communication device. In these implementations, the peripheral communication device communicates a peripheral data signal with the ink-receiving computing device to be transmitted to the digital inking device. In this way, data represented in the electrostatic data signal electrostatically communicated directly between the digital inking device and the peripheral communication device is also communicated over the peripheral data signal between the peripheral communication device and the ink-receiving computing device. In an implementation, the peripheral communication device includes logic to operate on the data transmitted from the ink-receiving computing device, modifying or operating on the transmitted data to generate instructions or other data to communicate with the digital inking device.

In an implementation, the electrostatic digital inking device communication interface can include more than one electrostatic antenna. For example, implementations are contemplated in which the digital inking device includes an electrostatic electrode on a first end (e.g., a tip electrode for inking), an electrostatic electrode on a second end (e.g., a tail electrode for erasing), and/or an electrostatic electrode positioned between the first end and the second end (e.g., a ring electrode for relative positioning). In an implementation, the electrostatic inking signals and the electrostatic data signals are transmitted by the same or different electrostatic electrodes.

In implementations, the electrostatic antenna(s) or electrode(s) of the electrostatic peripheral communication device communication interface can be positioned in multiple places, or a single antenna or electrode can extend substantially throughout the peripheral communication device. In an implementation in which the peripheral communication device is a docking station or charging case, the antenna or electrode is positioned to be proximal to an end of the digital inking device 306 when positioned in the peripheral communication device. This can provide a clean electrostatic signal without boosting power to communicate the electrostatic data signal.

In implementations, the peripheral communication device includes charging hardware for charging a battery of the digital inking device. As illustrated, the peripheral communication device includes a charging interface in electric communication with the power storage (e.g., a battery) of the digital inking device. The charging interfaces can include wireless or physical connections. In implementations, because the digital inking device and the peripheral communication device communicate by wireless electrostatic communication, the charging interfaces can be physical without also including physical connections for data communication (e.g., via Universal Serial Bus). This can reduce the hardware needed by the digital inking device, which makes the digital inking device cheaper and easier to manufacture. It also reduces the cost of the peripheral communication device that can rely on the electrostatic data signal to communicate data with the digital inking device rather than an additional physical data connection (e.g., via Universal Serial Bus) or wireless data connection (e.g., via near-field communication or Bluetooth).

Figure 5:
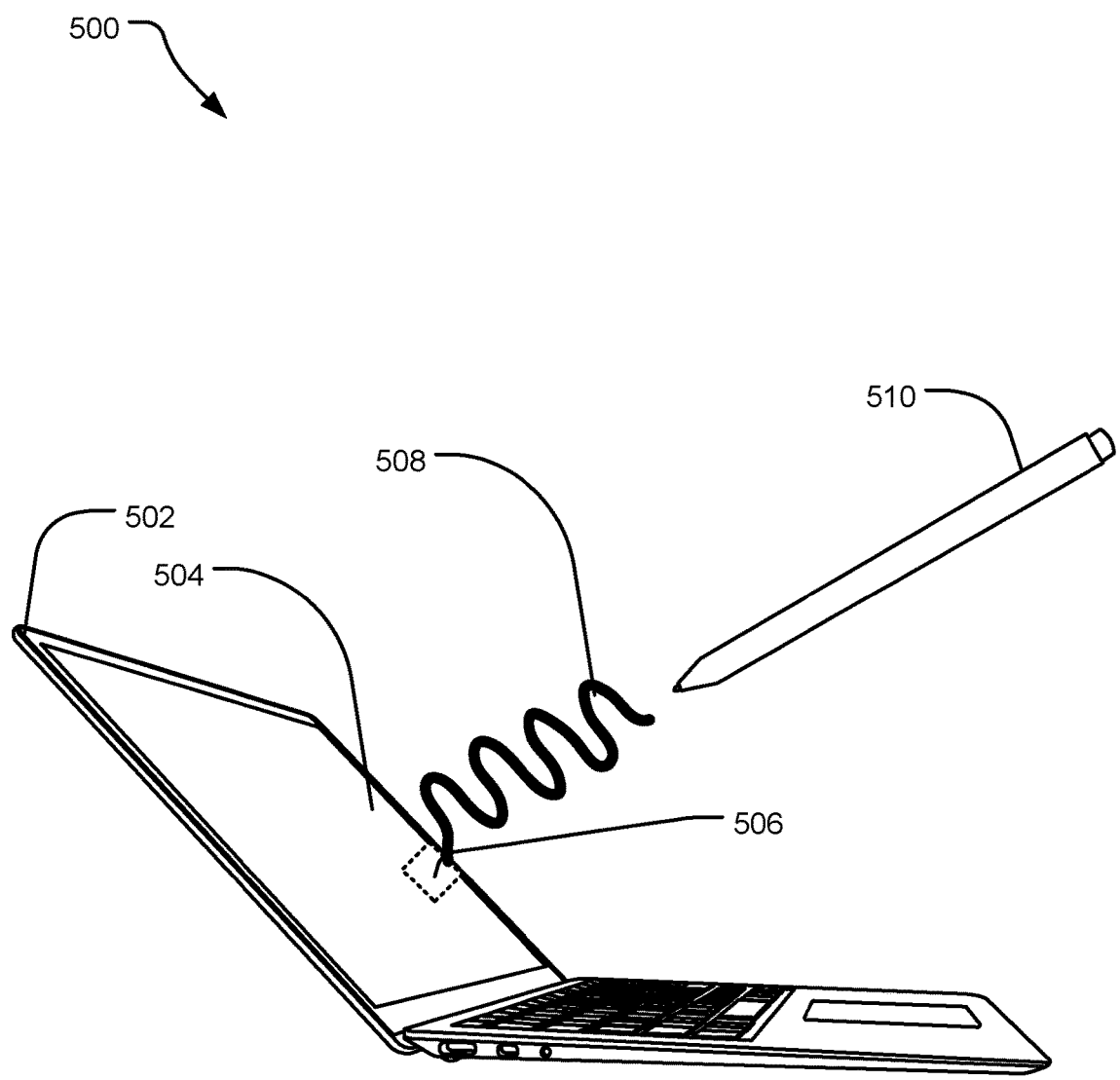
FIG. 5 illustrates an example system for wireless uplink transmission from a computing device to a digital inking device.

FIGS. 5-9 illustrate systems and operations for wireless uplink transmission from a computing device. FIG. 5 illustrates an example system 500 for wireless uplink transmission from a computing device 502 to a digital inking device 510. In the illustrated implementation, the digital inking device 510 is a stylus that communicates with a digitizer 506 in a display 504 of the computing device 502 using one or more of electrostatic communication 508 and electromagnetic communication. Other implementations of the digital inking device 510 include a remote studio dial, a dialer, a keyboard, or a mouse.

The digitizer 506 may communicate with the digital inking device 510 in order to receive input from the digital inking device 510 to affect the operation of the computing device 502. For example, the digital inking device 510 may be manipulated by a user to touch the display 504 and communicate a user's intent to render digital ink on the display 504.

During regular operation, the digitizer 506 may communicate with the digital inking device 510 using a multiuse communication protocol. Because the electrostatic or electromagnetic communication via a digitizer interface offers limited bandwidth for transfers of data that do not represent operations for active use of the digital inking device 510 with the computing device 502. For example, in implementations in which the digital inking device 510 is a stylus, when using multiuse communication protocols, a communication cycle over which updated communications are exchanged between the digital inking device 510 and the computing device 502 may be largely dedicated to locating the stylus relative to the display 504 and inking when the stylus is at a close enough proximity to the display 504 and/or if sufficient pressure is applied to the stylus. The communication cycle may be dominated by downlink and uplink blocks that may be conducted periodically and/or synchronously specifically for the active use of the stylus. This may leave few uplink blocks, if any, in a communication cycle to dedicate to uploading data in multiple consecutive uplink blocks.

In the presently disclosed technology, the digitizer 506 is configured to transition between a multiuse communication protocol in which the digitizer is configured to receive user input from the digital inking device 510 to affect the operation of the computing device (e.g., inking by the digital inking device 510 on the display 504) to a dedicated uplink communication protocol in which communication between the computing device 502 and the digital inking device 510 includes the transmission of multiple consecutive uplink blocks from the digitizer 506 to the digital inking device 510 before the digitizer 506 accepts downlink communications from the digital inking device 510. The downlink communications may include data representing the progress of the upload or may signal completion of the upload. By eliminating or limiting communication of input from the digital inking device 510 to affect the operation of the computing device 502 in a communication cycle, the electrostatic or electromagnetic communication from the digitizer 506 can be dedicated to the upload of data from the computing device 502 to the digital inking device 510.

In implementations, wireless communications may continue to be conducted using the dedicated uplink communication protocol until an upload completion condition is satisfied. Satisfaction of the upload completion condition may be based at least in part on whether the digital inking device 510 has confirmed that an upload has been completed. In implementations, while the communications are conducted using the dedicated uplink communication protocol, the digitizer 506 may continuously or periodically transmit a signal indicating that the communications are being conducted by the dedicated uplink communication protocol. When the upload completion condition is satisfied, the digitizer 506 may one or more of terminate the signal indicating that the communications are being conducted by the dedicated uplink protocol, generate a signal indicating that communications are being transitioned to using the multiuse communication protocol, and revert from using the dedicated uplink communication protocol to using the multiuse communication protocol.

In implementations, when the communications are being conducted using the dedicated uplink protocol, the computing device 502 may be configured to multicast the uplink data to more than one digital inking device (e.g., including the digital inking device 510). Unlike communications by larger bandwidth communication protocols (e.g., Bluetooth and wireless USB), which are tethered by each channel to a specific digital inking device, communications using the dedicated uplink protocol can simultaneously provide the update data to more than one of the digital inking device 510 via the electrostatic or electromagnetic communications from the digitizer 506. In implementations in which the dedicated uplink protocol provides data to more than one of the digital inking device 510, the computing device may be configured to track upload and/or update (e.g., firmware or software update) statuses of each digital inking device 510 that receive the upload and/or update.

In an implementation, the digitizer 506 is a type of touch sensor. For example, the digitizer may include a mesh of electrical traces or antennas formed within the structure of the touchscreen interface of the display 504. In resistive touchscreen technologies, the touch sensor or digitizer 506 is composed of the contact traces on the glass substrate that are connected to the upper conductive polyester layer under pressure. In capacitive touchscreen technologies, the touch sensor or digitizer 506 is composed of the conductive traces on the opposing surfaces forming the capacitive touch interface. In NFI touchscreen technologies, the touch sensor or digitizer 506 is composed of conductive antenna traces. For the purposes of this disclosure, hereinafter, reference to a digitizer 506 is intended to include reference to the conductive traces in any of these touch sensor technologies, which may generate generally consistent electric fields across the surface of the corresponding touchscreen interface. In implementations, communication via the digitizer may include electrostatic or electromagnetic communication facilitated by the detection or generation of changes in electric and/or magnetic fields generated by the digitizer 506 and/or the digital inking device 510. The changes in electric and/or magnetic fields may be measured and recognized as signals from an active stylus or another digital inking device 510.

In implementations, the digitizer 506 may be composed of a transparent protective cover layer as a top surface of a touchscreen interface (e.g., of the display 504) that is adhered to a transparent flexible substrate. An array of upper antenna traces may be formed on the bottom surface of the flexible substrate. The upper antenna traces may be made of a conductive transparent material, e.g., indium tin oxide, printed on the flexible substrate. The upper antenna traces may generally be parallel to each other and may be electrically coupled to one or more conductive plates along one or more edges of the touchscreen interface. Subsets of the upper antenna traces may be grouped into several different antenna sections, each electrically connected to a separate conductive plate along the edge of the touchscreen interface. An electrically insulating layer may be positioned beneath the upper antenna traces on the bottom surface of the flexible substrate. A glass layer may be positioned beneath the electrically insulating layer. An array of lower antenna traces may be formed on the top surface of the glass layer. The lower antenna traces may be made of a conductive transparent material, e.g., indium tin oxide, printed on the top surface of the glass layer. In an alternative embodiment, the lower antenna traces may be printed on a second transparent flexible substrate adhered to the top surface of the glass layer. The lower antenna traces may generally be parallel to each other and may be electrically coupled to one or more conductive plates along one or more edges of the touchscreen interface. The lower antenna traces may be oriented perpendicular to the direction of the upper antenna traces. Subsets of the lower antenna traces may be grouped into a number of different antenna sections, each corresponding to an opposing antenna section in the array of upper antenna traces. Each subset of the lower antenna traces may be electrically connected to a separate conductive plate along the edge of the touchscreen interface.

When the digital inking device 510 approaches or touches the display 504, interference with an electric field generated by the capacitive interaction between the upper and lower antenna traces alters the voltage in the touch location. This voltage change in the touch location can be measured and localized by the perpendicular grid arrangement of the upper and lower antenna traces. Additional determinations such as hover height (i.e., when the digital inking device 510 is slightly above, but not touching, the display 504) and inking (i.e., when the digital inking device 510 is in contact with the display 504) can be made by processing software and circuitry depending upon the significance of a change in the electric and/or magnetic field detected by the digitizer 506.

In implementations, the computing device 502 display generator for generating an image on the display 504 may be positioned beneath the glass layer. The display generator may be composed of a large array of pixels supported on a pixel substrate, e.g., an integrated circuit board providing addressable electronic connections to each of the pixels for control of the pixels. Each pixel may be composed of several photo emitting elements, for example, red/green/blue light emitters that generate the display images and a photo-receiving element for receiving light input for other data and control purposes. As noted, each of the layers above the glass layer is transparent. Thus, the light forming the images generated by the pixels by the display generator passes through the digitizer 506, and thus the display images of the touchscreen interface are visible on the display 504. Several display and touchscreen processing components (e.g., processors, memory with software instructions, and/or circuits) may be positioned below the display generator and may be communicatively coupled to the display generator and the digitizer 506 to provide control of and send data to and receive data from each.

In implementations, the digitizer 506 may be configured to additionally or alternatively exchange data with the digital inking device 510 other than data representing position and/or pressure applied by or to the digital inking device 510. For example, the electrostatic or electromagnetic data transmitted between the digitizer 506 can include one or more of, without limitation, data representing statuses of one or more of the digitizer 506 and the digital inking device 510, data representing peripheral input (e.g., user input) provided by the digital inking device 510 to the digitizer 506, data to be uploaded (e.g., a firmware update, copy/paste data, or any other data) to the digital inking device 510 from the digitizer 506, data representing confirmations of data transfer, and data (e.g., a signal) representing a communication protocol (e.g., a multiuse communication protocol or a dedicated uplink communication protocol) by which the digitizer 506 communicates.

Figure 6:
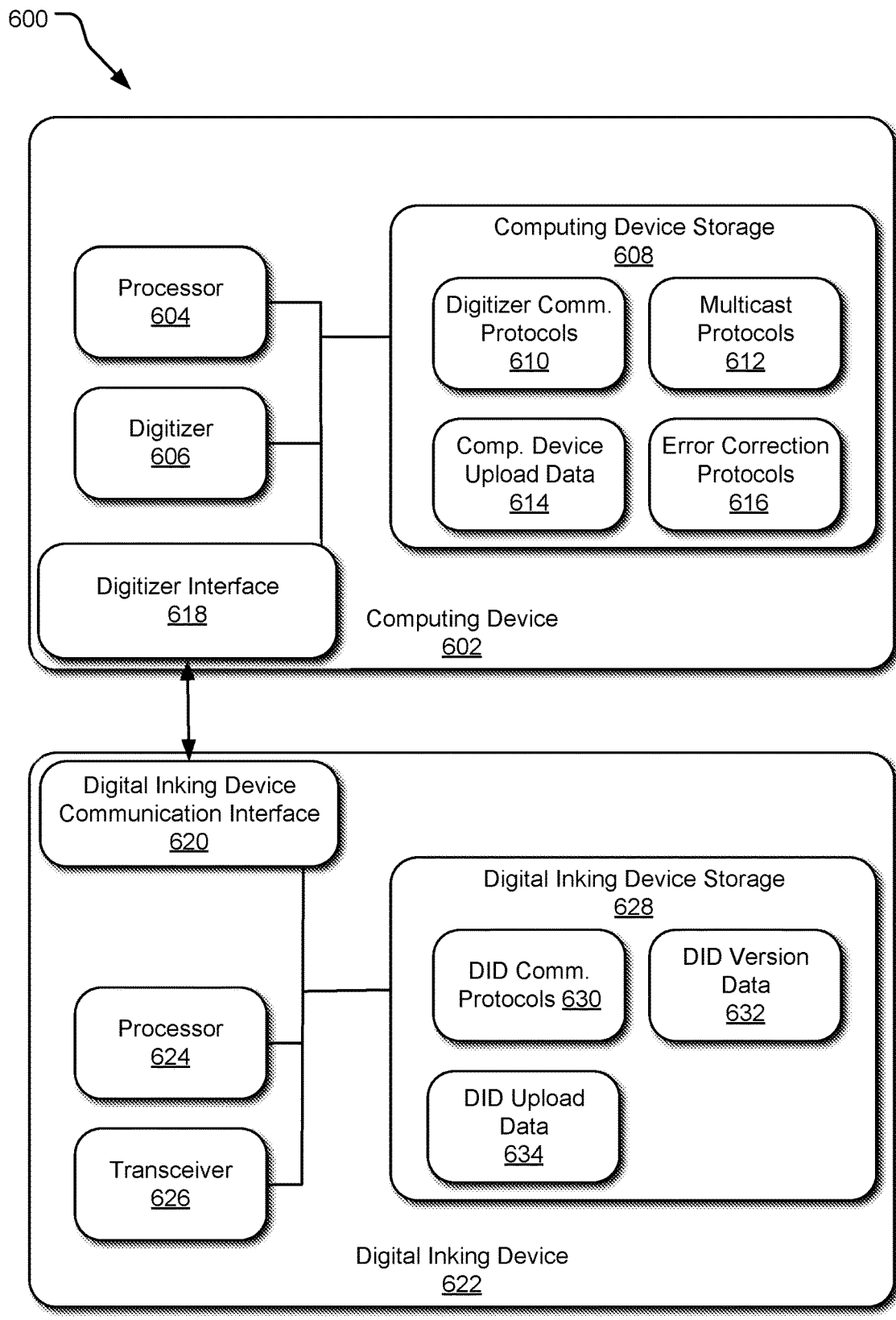
FIG. 6 illustrates an example electronics system for wireless uplink transmission from a computing device to a digital inking device.

FIG. 6 illustrates an example electronics system 600 for wireless uplink transmission from a computing device 602 to a digital inking device 622. In the illustrated implementation, the computing device 602 includes a processor 604, a computing device storage 608, and a digitizer 606. The digitizer 606 communicates with a digital inking device communication interface 620 of the digital inking device 622 via a digitizer interface 618. The digitizer interface 618 may be positioned at a display or a trackpad of the computing device 602 to interact with the digital inking device communication interface 620 of the digital inking device 622 using electrostatic or electromagnetic communications.

The computing device storage 608 of the computing device 602 may include one or more of digitizer communication protocols 610, multicast protocols 612, computing device upload data 614, or error correction protocols 616. The digitizer communication protocols 610 are protocols the digitizer 606 executes to communicate with the digital inking device 622 (e.g., one or more of a multiuse communication protocol and a dedicated uplink protocol). The digitizer communication protocols 610 may further dynamically or statically control uplink window and/or data upload unit sizes (e.g., based at least in part on predefined relationships) in order to ensure that the data is transmitted quickly and without error. Smaller windows or data upload unit sizes may decrease the likelihood of error but increase the transfer time (e.g., due to more error checks overall for each smaller unit).

In implementations, the digitizer communication protocols include triggers for transitioning between communication protocols. For example, the digitizer communication protocols 610 may be configured to determine if an upload is available for the digital inking device 622 and may determine to transition between a multiuse communication protocol to a dedicated uplink communication protocol to facilitate the upload. In implementations, the digitizer communication protocols 610 may be configured to first determine whether an upload is appropriate based on whether the upload is acceptable by the digital inking device 622 before transitioning or may transition regardless of a determination of upload acceptability. The determination of whether the upload is acceptable by the digital inking device 622 may be based on one or more of whether the upload represents a version of software or firmware relative to a version of the firmware or software stored on the digital inking device 622, whether the digital inking device 622 has sufficient storage to receive the upload, and whether the digital inking device 622 already has the same data stored (e.g., already copied data in a copy-and-paste operation). The digitizer communication protocols 610 may also be configured to revert back from the dedicated uplink communication protocol to the multiuse communication protocol. The reversion may be based at least in part on a determination that an upload completion condition is satisfied or based at least in part on a determination by the digitizer 606 and the digital inking device that the upload is unacceptable.

Multicast protocols 612 may include data for multicasting. The data may be configured to track the progress of uploads via uplink blocks simultaneously to more than one of the digital inking device 622. This data may include the ability to track identifiers of each digital inking device 622 and associate stored data in the computing device storage 608 with each digital inking device 622 via the identifiers. The associated stored data may include a status of each digital inking device 622, whether an upload is being or was conducted or failed, position data of a digital inking device 622, and localized display data to indicate a status of a digital inking device 622 in a user interface at a location proximate to the digital inking device 622 (e.g., in a grid in which each element of the grid is proximate a different digital inking device and indicates a status of the proximal digital inking device).

The computing device upload data 614 is data that is stored on the computing device 602 for upload by the digitizer 606 during uplink windows to update digital inking device upload data 634. In implementations, one or more of the computing device upload data 614, and the digital inking device upload data 634 may include one or more of, without limitation, a firmware update, a copied image, and a copied text string.

The error correction protocols 616 are protocols for correcting errors in data exchanged between the digitizer 606 and the digital inking device 622. The error correction protocols 616 may include protocols for ensuring the fidelity of the exchanged data, such as, without limitation, Reed-Solomon codes, Polar codes, checksums, or cyclic redundancy checks. In implementations, the error correction protocols 616 or complementary elements thereto are also stored in digital inking device storage 628.

While the computing device storage 608 is illustrated as an element separate from the digitizer 606, implementations are contemplated in which the elements stored in the computing device storage 608 are stored in the local firmware storage of the digitizer 606. Also, although illustrated separately, the digitizer interface 618 may be an integral element of the digitizer 606. Further, the operations of the digitizer 606 may be controlled by one or more of the processor 604 available generally to components of the computing device 602 and a processor that is integrated into or otherwise dedicated to the operation of the digitizer 606 and/or various components that facilitate operations of the digitizer 606.

In the illustrated implementation, the digital inking device 622 is an active digital inking device that is provided power to operate. The digital inking device includes a processor 624 and a transceiver 626 for receiving data from the digitizer 606 via the digital inking device communication interface 620. The digital inking device 622 further includes the digital inking device storage 628. In implementations, the digital inking device storage 628 includes one or more of digital inking device communication protocols 630, digital inking device version data 632, or digital inking device upload data 634.

The digital inking device communication protocols 630 include data for executing a communication protocol (e.g., one of a multiuse communication protocol and a dedicated uplink communication protocol) on the digital inking device 622. Implementations are contemplated in which the control over communication between the digitizer 606 and the digital inking device 622 is distributed between or controlled by the digitizer 606 and the digital inking device 622. Depending on the distribution of control, the digital inking device communication protocols 630 and the digitizer communication protocols 610 may conduct some communication operations, such as establishing the connections, determining which communication protocol to enter, determining when to transition to a different communication protocol, and determining when an upload is complete (e.g., satisfies an upload completion condition). An upload completion condition is a condition the satisfaction of which indicates that an upload is complete. The upload completion condition may indicate one or more of that data has been completely transmitted, that data has been completely received, that a data update based at least in part on the uploaded data has been completed, a confirmation or other indication that a data upload has been completed, and a confirmation that a firmware update of the digital inking device 622 has been completed.

The digital inking device version data 632 includes version data of software and/or firmware of the digital inking device 622. The digital inking device version data 632 can indicate whether the digital inking device 622 should receive an upload from the digitizer 606. For example, if the upload data represents a software or firmware update and the version of the software or firmware in the digital inking device version data 632 indicates that the digital inking device 622 already has the version to be uploaded or a newer version, the digital inking device may determine to refuse the upload from the digitizer 606. Another example is a copy-and-paste operation. If the digital inking device 622 already has stored an image to be uploaded in a copy operation, the digital inking device 622 may reject the upload of the redundant data. Further, if the upload size exceeds the available storage in the digital inking device 622, the digital inking device 622 may decline the upload. In another implementation, a dedicated uplink protocol communication can be used to upload data from the computing device 602 to the digital inking device 622 and to another computing device (not illustrated). This may allow the pen to be used as a communicative intermediary between the computing device 602 and the other computing device.

The digital inking device upload data 634 is data uploaded from the digitizer 606. The digital inking device upload data 634 may include copied data (e.g., for pasting), a software update, or a firmware update. The digital inking device upload data 634 may have been stored in the computing device upload data 614 prior to an upload of the data by the digitizer 606.

Figure 7:
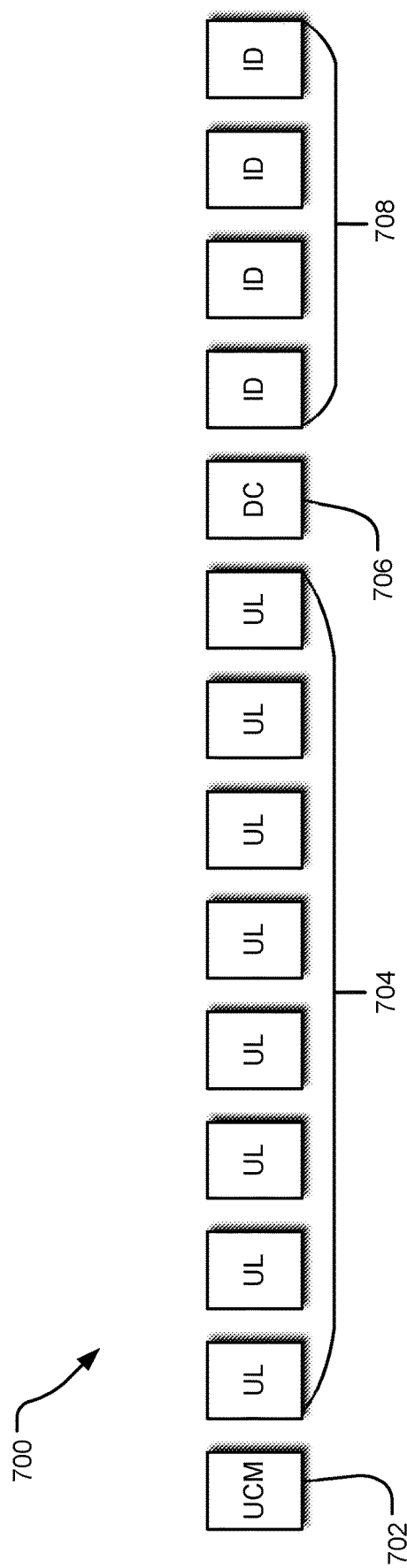
FIG. 7 illustrates an example communication cycle for a communication between a digitizer and a digital inking device using a dedicated uplink protocol.

FIG. 7 illustrates an example communication cycle 700 for communication between a digitizer and a digital inking device using a dedicated uplink protocol. The communication cycle 700 includes an uplink communication mode block 702 that indicates to the digital inking device that the communication protocol will be, is being, or has been transitioned to a dedicated uplink communication protocol. In implementations, this signal block may be continuously or periodically transmitted until an upload is finished (and a reversion to the multiuse communication protocol is appropriate). The dedicated uplink communication protocol is designed to facilitate faster uploads from the digitizer to the digital inking device by providing a predetermined minimum number of consecutive uplink blocks 704 in a communication cycle before the digitizer accepts downlink communications from the digital inking device. The dedicated uplink communication protocol is presented in contrast to a multiuse communication protocol by which the digital inking device provides input to the digitizer to affect the operation of the computing device of which the digitizer is a component or to which the digitizer is otherwise communicatively coupled. The communication cycle further includes a downlink confirmation block 706 that confirms the data from the consecutive uplink blocks 704 has been uploaded (e.g., in satisfaction of an upload completion condition). After the downlink confirmation block 706 data has been received by the digitizer in a downlink, the communication protocol may be reverted back to a multiuse communication protocol. Input data blocks 708 represent portions of a communication cycle during which the digitizer searches for touch and does not receive uplink data from the digital inking devices.

Figure 8:
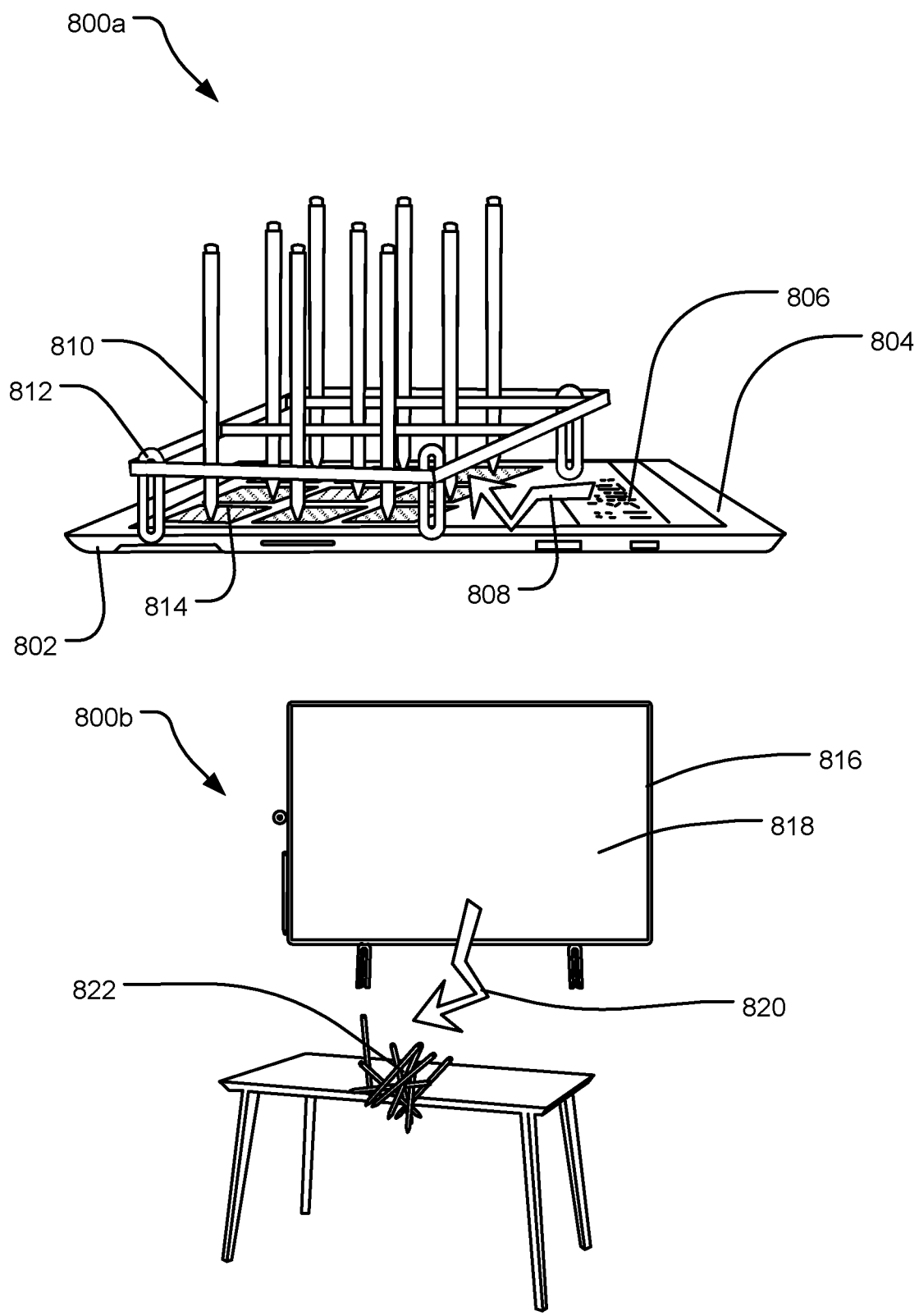
FIG. 8 illustrates example systems for multicasting uploads from a digitizer to multiple digital inking devices.

FIG. 8 illustrates example systems 800a and 800b for multicasting uploads from a digitizer to digital inking devices 810 and 822. System 800a illustrates an implementation of a position-dependent multicasting configuration. In the position-dependent multicasting configuration, a user interface 806 of a first display 804 of a first computing device 802 has a position-dependent indicator 814 corresponding to a digital inking device 810 most proximal to the position-dependent indicator 814. The digitizer (not illustrated) of the first display 804 communicates via electrostatic or electromagnetic communication 808. In the illustrated implementation, the digital inking device 810 is positioned in a frame 812 to maintain the proximity of the digital inking device 810 to the position-dependent indicator 814 and facilitate local communication specifically with the digital inking device 810. In the illustrated implementation, the pattern of the position-dependent indicator 814 indicates that an upload to or firmware or software update in the digital inking device 810 satisfies an upload completion condition indicating that the data was successfully uploaded and/or installed.

The position-dependent indicator 814 can be indicative of other qualities of the digital inking device 810, such as the current charge status of the digital inking device 810, a status that the digital inking device 810 has copied data for pasting, the progress of an upload or update to the digital inking device 810, random identifiers assigned or assignable to each digital inking device 810, and/or a status that the digital inking device is operating in a particular mode of operation (e.g., a style or color of inking). To facilitate the position-dependent indicator 814, a digitizer of the first computing device 802 may determine location data and an associated identifier of the digital inking device 810 to associate the position-dependent indicator 814 with the digital inking device 810. The digitizer may receive data including one or more of digital inking device version data, an upload confirmation (e.g., via a downlink confirmation block), a power status of the digital inking device 810, an operating mode of the digital inking device 810 (e.g., a color emitted by lights of or color or style of inking from a stylus), or digital inking device upload data (e.g., copied data to be pasted to the first display 804 or a different display) from the digital inking device 810. The received data may be used to update the position-dependent indicator 814.

The system 800b illustrates a proximity multicasting system that simultaneously casts upload data to any of a plurality of digital inking devices 822 within a predefined proximity relative to a digitizer (not illustrated) sufficient to satisfy a proximity condition (e.g., within a threshold range or within a range of distances from the digitizer). The system 800b includes a second computing device 816, with a second display 818. The second display 818 includes a digitizer (not illustrated) that communicates via an electrostatic and/or electromagnetic multicasted communication 820. In implementations, the electrostatic and/or electromagnetic multicasted communication 820 provides upload data to all of the plurality of digital inking devices 822 that satisfy the proximity condition and/or may do so without identifying any of the plurality of digital inking devices 822. In these implementations, each of the plurality of digital inking devices 822 may control whether an upload occurs and error handling (e.g., with error correction protocols stored in each of the plurality of digital inking devices 822.

Unlike other communication means such as Bluetooth and wireless USB, electrostatic or electromagnetic communication through a digitizer like the ones of the first computing device 802 and the second computing device 816 can simultaneously communicate by multicast with any number of digital inking devices 810 and 822 that are within a predefined proximity. For technicians who are tasked with updating a large number of digital inking devices 810 and 822, the multicasting could save significant time because digital inking devices 810 and 822 could be updated simultaneously and with fewer limitations on the number of simultaneous uploads to the digital inking devices 810 and 822 than by means of Bluetooth or wireless USB.

Figure 9:
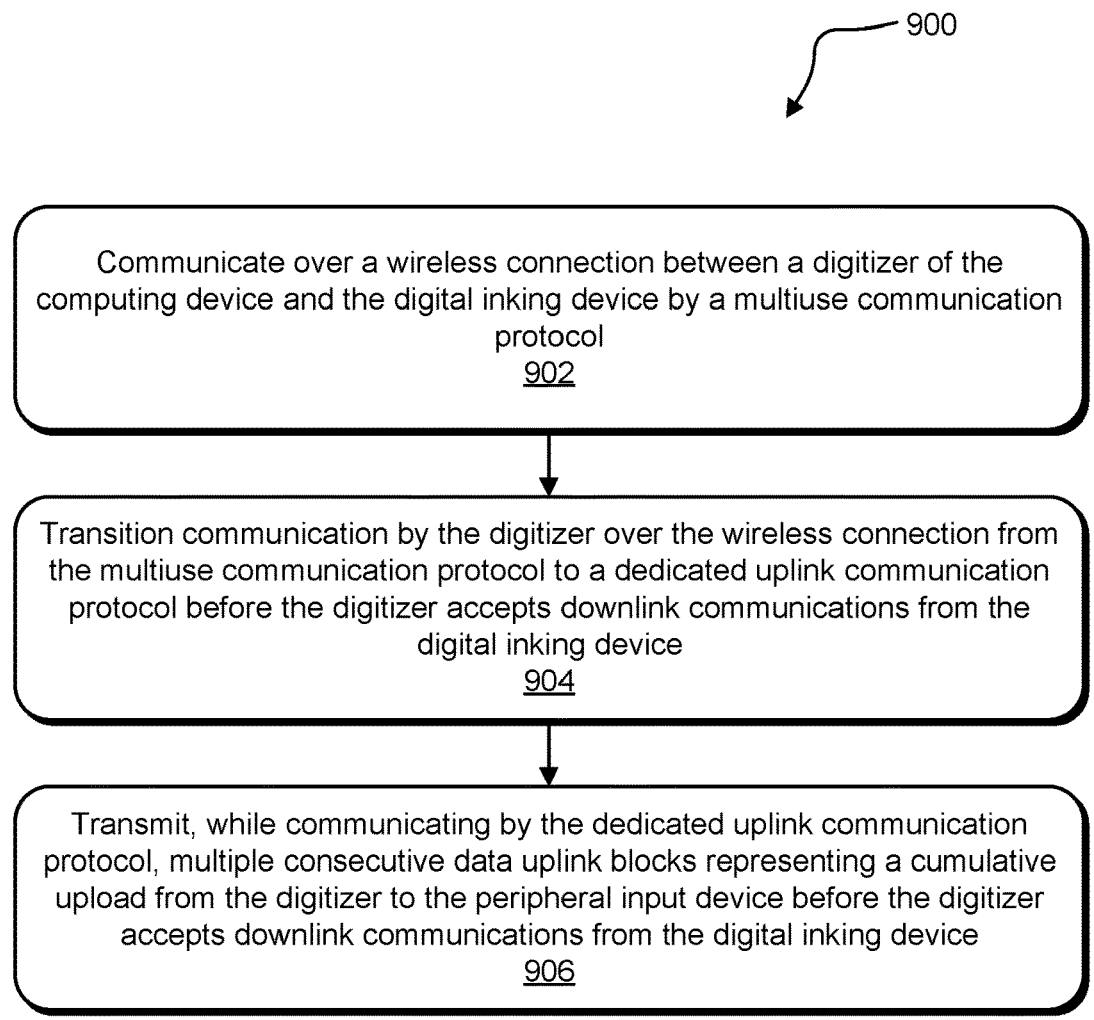
FIG. 9 illustrates example operations for wireless uplink transmission from a computing device to a digital inking device.

FIG. 9 illustrates example operations 900 for wireless uplink transmission from a computing device to a digital inking device. A communicating operation 902 communicates over a wireless connection between a digitizer (e.g., an element of a display or trackpad) of the computing device and the digital inking device (e.g., a stylus, studio dial, mouse, or keyboard) by a multiuse communication protocol in which the digitizer is configured to receive input from the digital inking device to affect the operation of the computing device.

In an implementation, the digital inking device communicates with a digitizer in a display of the computing device using one or more of electrostatic communication or electromagnetic communication. The digitizer may communicate with the digital inking device in order to receive input from the digital inking device to affect the operation of the computing device. For example, the digital inking device may be manipulated by a user to touch the display and communicate a user's intent to ink on the display.

During regular operation, the digitizer may communicate with the digital inking device using a multiuse communication protocol. Because the electrostatic or electromagnetic communication via a digitizer interface offers limited bandwidth for transfers of data that do not represent operations for active use of the digital inking device with the computing device. For example, in implementations in which the digital inking device is a stylus, when using multiuse communication protocols, a communication cycle over which updated communications are exchanged between the digital inking device and the computing device may be largely dedicated to locating the stylus relative to the display and inking when the stylus is at a close enough proximity to the display and/or if sufficient pressure is applied to the stylus. The communication cycle may be dominated by downlink and uplink blocks that may be conducted periodically and/or synchronously specifically for the active use of the stylus. This may leave few uplink blocks, if any, in a communication cycle to dedicate to uploading data in multiple consecutive uplink blocks.

A transitioning operation 904 transitions communication by the digitizer over the wireless connection from the multiuse communication protocol to a dedicated uplink communication protocol in which communication between the computing device and the digital inking device includes the transmission of multiple consecutive uplink blocks from the digitizer to the digital inking device before the digitizer accepts downlink communications from the digital inking device.

The digitizer and/or the digital inking device is configured to transition between a multiuse communication protocol in which the digitizer is configured to receive user input from the digital inking device to affect the operation of the computing device (e.g., inking by the digital inking device on the display) to a dedicated uplink communication protocol in which communication between the computing device and the digital inking device includes the transmission of multiple consecutive uplink blocks to from the digitizer to the digital inking device before the digitizer accepts downlink communications from the digital inking device. By eliminating or limiting communication of input from the digital inking device to affect the operation of the computing device in a communication cycle, the electrostatic or electromagnetic communication from the digitizer can be at least largely dedicated to the upload of data from the computing device to the digital inking device.

In implementations, the transitioning operation 904 may be triggered by a determination by one or more of the digitizer, the digital inking device, or a user that data be uploaded to the digital inking device. In an implementation, the version information for software or firmware may be stored within the digital inking device. One or more of the digital inking device or the digitizer may determine that an update would benefit the operation of the digital inking device. In implementations, the digitizer may issue a request to the digital inking device to accept a data upload, and the digital inking device may refuse the upload. Refusal of the upload may be based at least in part on one or more of the digital inking device storage being too full to accept the upload, the digital inking device determining that digital inking device version data indicates that the upload reflects a version of software or firmware that is the same version or an older version of the software or firmware relative as the version stored in the digital inking device version data. In another implementation, the software or firmware version data may be compared by the digitizer or a computing device to which the digitizer is communicatively coupled to determine whether the upload represents a new version of the software or firmware that should be uploaded to the digital inking device.

A transmitting operation 906 transmits while communicating by the dedicated uplink communication protocol multiple consecutive data uplink blocks representing a cumulative upload from the digitizer to the digital inking device before the digitizer accepts downlink communications from the digital inking device. In implementations, the cumulative upload includes an update to the firmware of the digital inking device.

In implementations, the wireless communications may continue to provide upload data to the digital inking device using the dedicated uplink communication protocol until an upload completion condition is satisfied. Satisfaction of the upload completion condition may be based at least in part on whether the digital inking device has confirmed that an upload has been completed. The upload completion condition may indicate one or more of that data has been completely transmitted, that data has been completely received, that a data update based at least in part on the uploaded data has been completed, a confirmation or other indication that a data upload has been completed, and a confirmation that a firmware update of the digital inking device has been completed.

In implementations, while the communications are conducted using the dedicated uplink communication protocol, the digitizer may continuously or periodically transmit a signal indicating that the communications are being conducted by the dedicated uplink communication protocol. The signal indicating communications are being conducted by the dedicated uplink communication protocol may allow the digital inking device to maintain the dedicated uplink protocol for only as long as necessary and to allow the timely resumption of downlink communications for the use of the digital inking device with the computing device. When the upload completion condition is satisfied, the digitizer may one or more of terminate the signal indicating that the communications are being conducted by the dedicated uplink protocol, generate a signal indicating that communications are being transitioned to using the multiuse communication protocol, and revert from using the dedicated uplink communication protocol to using the multiuse communication protocol. Reversion back to communicating by the multiuse communication protocol may save energy relative to communicating by the dedicated uplink communication protocol and may also allocate a greater portion of the communication cycle to downlinks for seamless use of the digital inking device (e.g., a use that is not available in the dedicated uplink protocol).

In implementations, the electrostatic or electromagnetic data transmitted between the digitizer and the digital inking device can include one or more of, without limitation, data representing a position or orientation digital inking device relative to the digitizer, data representing pressure applied by or to the digital inking device, data representing statuses of one or more of the digitizer and the digital inking device, data representing peripheral input (e.g., user input) provided by the digital inking device to the digitizer, data to be uploaded (e.g., a firmware update, copy/paste data, or any other data) to the digital inking device from the digitizer, data representing confirmations of data transfer, and data (e.g., a signal) representing a communication protocol (e.g., a multiuse communication protocol or a dedicated uplink communication protocol) by which the digitizer communicates. In implementations, the digitizer transmits to the digital inking device a signal indicating the dedicated uplink communication protocol is active while communication is conducted by the dedicated uplink communication protocol.

In implementations, the transmitting operation 906 includes multicasting the multiple consecutive data uplink blocks to the digital inking device and at least one other digital inking device. The digitizer may be configured to multicast the uplink data to more than one digital inking device. Unlike communications by larger bandwidth communication protocols (e.g., Bluetooth and wireless USB), which are tethered by each channel to a specific digital inking device, communications using the dedicated uplink protocol can simultaneously provide the update data to multiple digital inking devices via the electrostatic or electromagnetic communications from the digitizer.

In implementations, the operations 900 further include a reverting operation (not illustrated) that reverts communication by the digitizer over the wireless connection from the dedicated uplink communication protocol to the multiuse communication protocol based at least in part on the satisfaction of an upload completion condition. In implementations, the upload completion condition is based at least in part on confirmation by the digital inking device that the cumulative upload is complete.

Figure 10:
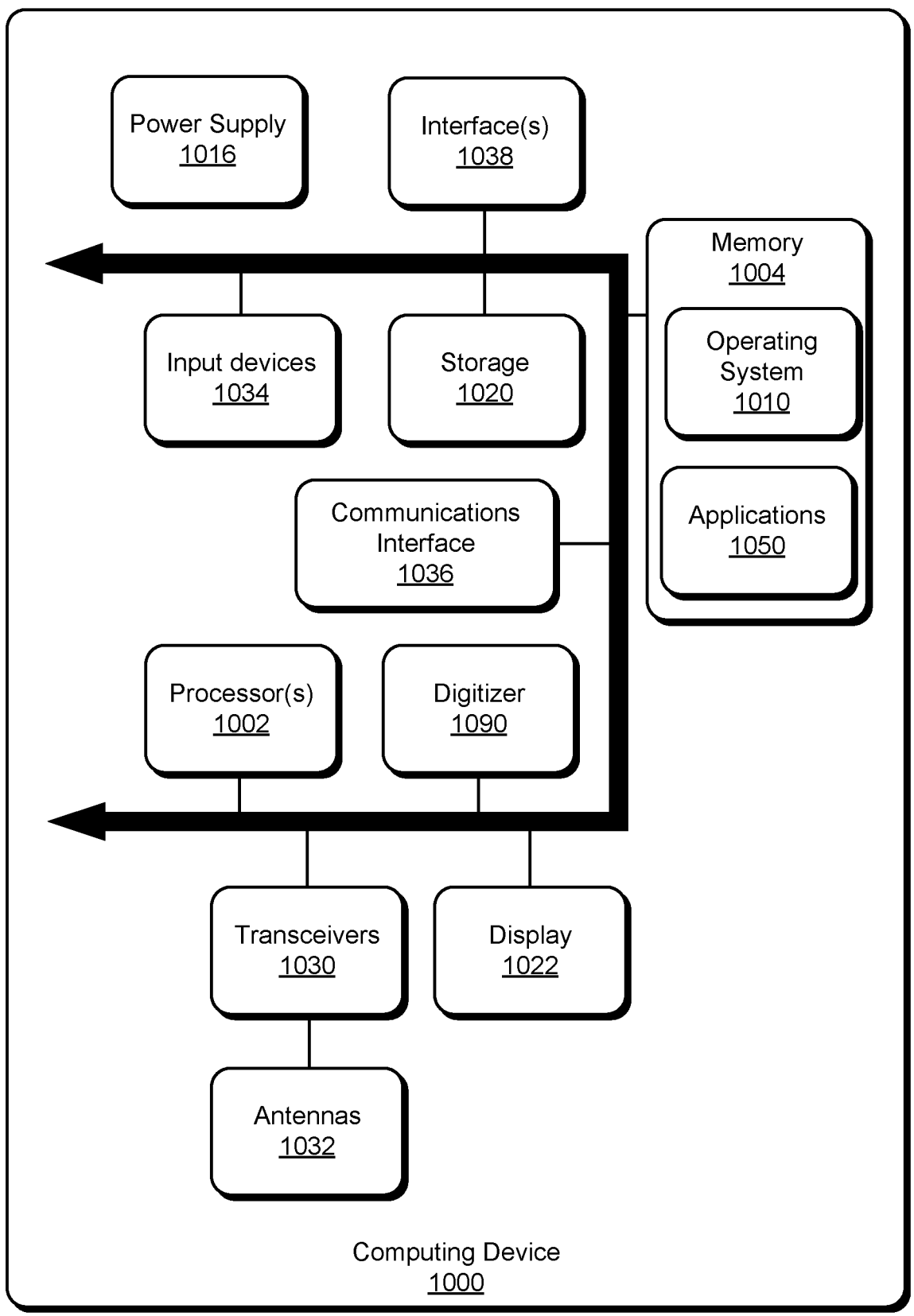
FIG. 10 illustrates an example computing device for implementing the features and operations of the described technology.

FIG. 10 illustrates an example computing device 1000 for implementing the features and operations of the described technology. The computing device 1000 may embody a remote-control device or a physically controlled device and is an example network-connected and/or network-capable device and may be a client device, such as a laptop, mobile device, desktop, tablet; a server/cloud device; an internet-of-things device; an electronic accessory; or another electronic device. The computing device 1000 includes one or more processor(s) 1002 and a memory 1004. The memory 1004 generally includes both volatile memory (e.g., RAM) and nonvolatile memory (e.g., flash memory). An operating system 1010 resides in the memory 1004 and is executed by the processor(s) 1002.

In an example computing device 1000, as shown in FIG. 10, one or more modules or segments, such as automated actuator protocols, applications 1050, an ink mode controller, a proximity detector, digitizer communication protocols, a multiuse communication protocol, a dedicated uplink communication protocol, multicast protocols, error correction protocols, digital inking device communication protocols, digital inking device version data, are loaded into the operating system 1010 on the memory 1004 and/or storage 1020 and executed by processor(s) 1002. The storage 1020 may include one or more tangible storage media devices and may store electrostatic inking signals, electrostatic data signals, peripheral data signals, a detected proximity, a proximity condition, telemetry data, pen status data, inking data, pressure data, firmware update data, computing device upload data, digital inking device upload data, inking styles, inking colors, copy-and-paste copied data, copied strings, copied images, color or nature of emitted light from a digital inking device, an identifier of a digital inking device, a relative position of a digital inking device relative to a display or trackpad, pressure data representing pressure applied by or to a peripheral interface device, uplink blocks, downlink blocks, a position-dependent indicator, an uplink communication mode block, a predetermined minimum number of consecutive uplink blocks, a downlink confirmation block, a communication cycle, an input data block, a communication cycle, an upload completion condition, a proximity condition, locally and globally unique identifiers, requests, responses, and other data and be local to the computing device 1000 or may be remote and communicatively connected to the computing device 1000.

The computing device 1000 includes a power supply 1016, which is powered by one or more batteries or other power sources and which provides power to other components of the computing device 1000. The power supply 1016 may also be connected to an external power source that overrides or recharges the built-in batteries or other power sources.

The computing device 1000 may include one or more communication transceivers 1030, which may be connected to one or more antenna(s) 1032 to provide network connectivity (e.g., mobile phone network, Wi-Fi®, Bluetooth®) to one or more other servers and/or client devices (e.g., mobile devices, desktop computers, or laptop computers). The computing device 1000 may further include a communications interface 1036 (e.g., a network adapter), which is a type of computing device. The computing device 1000 may use the communications interface 1036 and any other types of computing devices for establishing connections over a wide-area network (WAN) or local-area network (LAN). It should be appreciated that the network connections shown are examples and that other computing devices and means for establishing a communications link between the computing device 1000 and other devices may be used.

The computing device 1000 may include one or more input devices 1034 such that a user may enter commands and information (e.g., a keyboard or mouse). The one or more input devices 1034 may be implementations of the digital inking devices described herein and/or may be implementations of the computing device 1000. These and other input devices may be coupled to the server by one or more interfaces 1038, such as a serial port interface, parallel port, or universal serial bus (USB). The computing device 1000 may further include a display 1022, such as a touchscreen display.

In implementations, the computing device 1000 may include a digitizer 1090. In an implementation, the digitizer 1090 is an element of a touch sensor. For example, the digitizer 1090 may include a mesh of electrical traces or antennas formed within the structure of a touchscreen interface of the display 1022. In resistive touchscreen technologies, the touch sensor or digitizer 1090 is composed of contact traces on the glass substrate that are connected to the upper conductive polyester layer under pressure. In capacitive touchscreen technologies, the touch sensor or digitizer 1090 is composed of the conductive traces on the opposing surfaces forming the capacitive touch interface. In NFI touchscreen technologies, the touch sensor or digitizer 1090 is composed of conductive antenna traces. For the purposes of this disclosure, hereinafter, reference to a digitizer 1090 is intended to include reference to the conductive traces in any of these touch sensor technologies, which may generate generally consistent electric fields across the surface of the corresponding touchscreen interface. In implementations, communication via the digitizer may include electrostatic or electromagnetic communication facilitated by the detection or generation of changes in electric and/or magnetic fields generated by the digitizer 1090. The changes in electric and/or magnetic fields may be measured and recognized as signals from an active stylus or another of the one or more input devices 1034 (e.g., a peripheral input device or a digital inking device).

In implementations, the digitizer 1090 may be composed of a transparent protective cover layer as a top surface of a touchscreen interface (e.g., of the display 1022) that is adhered to a transparent flexible substrate. An array of upper antenna traces may be formed on the bottom surface of the flexible substrate. The upper antenna traces may be made of a conductive transparent material, e.g., indium tin oxide, printed on the flexible substrate. The upper antenna traces may generally be parallel to each other and may be electrically coupled to one or more conductive plates along one or more edges of the touchscreen interface. Subsets of the upper antenna traces may be grouped into several different antenna sections, each electrically connected to a separate conductive plate along the edge of the touchscreen interface. An electrically insulating layer may be positioned beneath the upper antenna traces on the bottom surface of the flexible substrate. A glass layer may be positioned beneath the electrically insulating layer. An array of lower antenna traces may be formed on the top surface of the glass layer. The lower antenna traces may be made of a conductive transparent material, e.g., indium tin oxide, printed on the top surface of the glass layer. In an alternative embodiment, the lower antenna traces may be printed on a second transparent flexible substrate adhered to the top surface of the glass layer. The lower antenna traces may generally be parallel to each other and may be electrically coupled to one or more conductive plates along one or more edges of the touchscreen interface. The lower antenna traces may be oriented perpendicular to the direction of the upper antenna traces. Subsets of the lower antenna traces may be grouped into a number of different antenna sections, each corresponding to an opposing antenna section in the array of upper antenna traces. Each subset of the lower antenna traces may be electrically connected to a separate conductive plate along the edge of the touchscreen interface.

When one of the one or more input devices 1034 (e.g., a digital inking device or a peripheral input device) approaches or touches the display 1022 with the digitizer 1090, interference with an electric field generated by the capacitive interaction between the upper and lower antenna traces alters the voltage in the touch location. This voltage change in the touch location can be measured and localized by the perpendicular grid arrangement of the upper and lower antenna traces. Additional determinations such as hover height (i.e., when the digital inking device is slightly above, but not touching, the display 1022 or a trackpad with the digitizer 1090) and inking (i.e., when the one of the one or more input devices 1034 is in contact with the display 1022) can be made by processing software and circuitry depending upon the significance of change in the electric field detected by the digitizer 1090.

In implementations, the computing device 1000 includes a display generator for generating an image on the display 1022 positioned beneath the glass layer. The display generator may be composed of a large array of pixels supported on a pixel substrate, e.g., an integrated circuit board providing addressable electronic connections to each of the pixels for control of the pixels. Each pixel may be composed of several photo-emitting elements, for example, red/green/blue light emitters that generate the display images and a photo-receiving element for receiving light input for other data and control purposes. As noted, each of the layers above the glass layer is transparent. Thus, the light forming the images generated by the pixels by the display generator passes through the digitizer 1090, and thus the display images of the touchscreen interface are visible on the display 1022. Several display and touchscreen processing components (e.g., processors, memory with software instructions, and/or circuits) may be positioned below the display generator and may be communicatively coupled to the display generator and the digitizer 1090 to provide control of and send data to and receive data from each.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method for controlling a digital inking device is provided. The method includes communicating electrostatic inking signals between the digital inking device and an ink-receiving computing device in an inking mode, the inking mode enabling the digital inking device to render digital ink in a display of the ink-receiving computing device via the electrostatic inking signals; detecting proximity of a peripheral communication device relative to the digital inking device; transitioning the digital inking device from the inking mode to a non-inking mode that terminates communication of the electrostatic inking signals between the digital inking device and the ink-receiving computing device, based at least in part on the detecting operation; and communicating electrostatic data signals in the non-inking mode between the digital inking device and the peripheral communication device in the non-inking mode, based at least in part on transitioning to the non-inking mode.

Another example method of any preceding method is provided, wherein the detecting operation is based at least in part on the digital inking device being in the inking mode.

Another example method of any preceding method is provided, wherein the ink-receiving computing device is communicatively coupled with the peripheral communication device, the method further comprising: communicating data represented in the electrostatic data signals between the ink-receiving computing device and the digital inking device via the peripheral communication device.

Another example method of any preceding method is provided, wherein the communicated electrostatic data signal includes telemetry data from the digital inking device communicated to the peripheral communication device.

Another example method of any preceding method is provided, wherein the communicated electrostatic data signal includes update data to update firmware of the digital inking device communicated to the digital inking device.

Another example method of any preceding method is provided, wherein the communicated electrostatic data signal includes a pen status of the digital inking device communicated to the peripheral communication device.

Another example method of any preceding method is provided, wherein the electrostatic inking signal communication and the electrostatic data signal communication are conducted via an electrostatic antenna in the digital inking device.

An example system for controlling a digital inking device is provided. The system includes one or more hardware processors; an electrostatic digital inking device communication interface configured to communicate electrostatic inking signals between the digital inking device and an ink-receiving computing device in an inking mode, the inking mode enabling the digital inking device to render digital ink in a display of the ink-receiving computing device via the electrostatic inking signals; a proximity detector configured to detect proximity of a peripheral communication device relative to the digital inking device; and an ink-mode controller executable by the one or more hardware processors and configured to transition the digital inking device from the inking mode to a non-inking mode that terminates communication of the electrostatic inking signals between the digital inking device and the ink-receiving computing device, based at least in part on the detected proximity, wherein the electrostatic digital inking device communication interface is further configured to communicate electrostatic data signals in the non-inking mode between the digital inking device and the peripheral communication device in the non-inking mode, based at least in part on transitioning to the non-inking mode.

Another example system of any preceding system is provided, wherein the proximity detector detects the proximity based at least in part on the digital inking device being in the inking mode.

Another example system of any preceding system is provided, wherein data represented by the electrostatic data signals is communicated between the ink-receiving computing device and the digital inking device via the peripheral communication device.

Another example system of any preceding system is provided, wherein the communicated electrostatic data signal includes telemetry data from the digital inking device communicated to the peripheral communication device.

Another example system of any preceding system is provided, wherein the communicated electrostatic data signal includes update data to update firmware of the digital inking device communicated to the digital inking device.

Another example system of any preceding system is provided, wherein the communicated electrostatic data signal includes a pen status of the digital inking device communicated to the peripheral communication device.

Another example system of any preceding system is provided, the electrostatic digital inking device communication interface further comprising: an electrostatic antenna, wherein the electrostatic inking signal communication and the electrostatic data signal communication are conducted via the electrostatic antenna.

One or more example tangible processor-readable storage media embodied with instructions for executing on one or more processors and circuits of a computing device a process for controlling a digital inking device is provided. The process includes communicating electrostatic inking signals between the digital inking device and an ink-receiving computing device in an inking mode, the inking mode enabling the digital inking device to render digital ink in a display of the ink-receiving computing device via the electrostatic inking signals; detecting proximity of a peripheral communication device relative to the digital inking device; transitioning the digital inking device from the inking mode to a non-inking mode that terminates communication of the electrostatic inking signals between the digital inking device and the ink-receiving computing device, based at least in part on the detecting operation; and communicating electrostatic data signals in the non-inking mode between the digital inking device and the peripheral communication device in the non-inking mode, based at least in part on transitioning to the non-inking mode.

One or more other example tangible processor-readable storage media of any preceding media are provided, wherein the detecting operation is based at least in part on the digital inking device being in the inking mode.

One or more other example tangible processor-readable storage media of any preceding media are provided, wherein the ink-receiving computing device is communicatively coupled with the peripheral communication device, the process further comprising: communicating data represented in the electrostatic data signals between the ink-receiving computing device and the digital inking device via the peripheral communication device.

One or more other example tangible processor-readable storage media of any preceding media are provided, wherein the communicated electrostatic data signal includes telemetry data from the digital inking device communicated to the peripheral communication device.

One or more other example tangible processor-readable storage media of any preceding media are provided, wherein the communicated electrostatic data signal includes update data to update firmware of the digital inking device communicated to the digital inking device.

One or more other example tangible processor-readable storage media of any preceding media are provided, wherein the communicated electrostatic data signal includes a pen status of the digital inking device communicated to the peripheral communication device.

An example system for controlling a digital inking device is provided. The method includes means for communicating electrostatic inking signals between the digital inking device and an ink-receiving computing device in an inking mode, the inking mode enabling the digital inking device to render digital ink in a display of the ink-receiving computing device via the electrostatic inking signals; means for detecting proximity of a peripheral communication device relative to the digital inking device; means for transitioning the digital inking device from the inking mode to a non-inking mode that terminates communication of the electrostatic inking signals between the digital inking device and the ink-receiving computing device, based at least in part on the detection of the proximity; and means for communicating electrostatic data signals in the non-inking mode between the digital inking device and the peripheral communication device in the non-inking mode, based at least in part on the transition to the non-inking mode.

Another example system of any preceding system is provided, wherein the detection of the proximity is based at least in part on the digital inking device being in the inking mode.

Another example system of any preceding system is provided, wherein the ink-receiving computing device is communicatively coupled with the peripheral communication device, the system further comprising: means for communicating data represented in the electrostatic data signals between the ink-receiving computing device and the digital inking device via the peripheral communication device.

Another example system of any preceding system is provided, wherein the communicated electrostatic data signal includes telemetry data from the digital inking device communicated to the peripheral communication device.

Another example system of any preceding system is provided, wherein the communicated electrostatic data signal includes update data to update firmware of the digital inking device communicated to the digital inking device.

Another example system of any preceding system is provided, wherein the communicated electrostatic data signal includes a pen status of the digital inking device communicated to the peripheral communication device.

Another example system of any preceding system is provided, wherein the electrostatic inking signal communication and the electrostatic data signal communication are conducted via an electrostatic antenna in the digital inking device.

An example method for wireless uplink transmission from a computing device to a peripheral input device is provided. The method includes communicating over a wireless connection between a digitizer of the computing device and the peripheral input device by a multiuse communication protocol in which the digitizer is configured to receive input from the peripheral input device to affect operation of the computing device, transitioning communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and transmitting, while communicating by the dedicated uplink communication protocol, multiple consecutive data uplink blocks representing a cumulative upload from the digitizer to the peripheral input device before the digitizer accepts a downlink communication from the peripheral input device. Using a dedicated uplink communication protocol for uploads improves the speed by which an upload can be accomplished relative to a multiuse communication protocol.

Another example method of any preceding method is provided, the method including reverting communication by the digitizer over the wireless connection from the dedicated uplink communication protocol to the multiuse communication protocol based at least in part on satisfaction of an upload completion condition. Reverting to a multiuse communication protocol can save power relative to the dedicated uplink communication protocol and can allow for the peripheral input device to communicate with the computing device to affect the operation of the computing device.

Another example method of any preceding method is provided, wherein the upload completion condition is based at least in part on a confirmation by the peripheral input device that the cumulative upload is complete. Confirming that an upload is complete before reverting to a multiuse communication protocol can ensure that an upload is completed using the dedicated uplink communication protocol.

Another example method of any preceding method is provided, wherein the cumulative upload includes an update to firmware of the peripheral input device. Firmware updates can be sufficiently large such that relying on the few uplink windows within a multiuse communication protocol communication cycle is too slow and impractical.

Another example method of any preceding method is provided, wherein the operation of transmitting includes multicasting the multiple consecutive data uplink blocks to the peripheral input device and at least one other peripheral input device. Mutlicasting uploads simultaneously to multiple devices can provide a faster upload Another example method of any preceding method is provided, the method further including transmitting, by the digitizer to the peripheral input device, a signal indicating the dedicated uplink communication protocol is active, while communication is conducted by the dedicated uplink communication protocol.

Another example method of any preceding method is provided, wherein the digitizer is an element of one or more of a display and a trackpad communicatively coupled to the computing device.

Another example method of any preceding method is provided, wherein the peripheral input device is one or more of a digital pen and a remote controller.

An example system for wireless uplink transmission from a computing device to a peripheral input device is provided. The system includes one or more hardware processors configured to execute instructions from memory, a digitizer interface configured to communicate over a wireless connection between the computing device and the peripheral input device by a multiuse communication protocol in which the computing device is configured to receive user input from the peripheral input device via the digitizer interface to affect operation of the computing device, digitizer communication protocols executable by the one or more hardware processors and configured to transition communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and a digitizer to transmit via the digitizer interface, while communicating by the dedicated uplink communication protocol, multiple consecutive data uplink blocks representing a cumulative upload from the digitizer to the peripheral input device before the digitizer accepts a downlink communication from the peripheral input device.

Another example system of any preceding system is provided, wherein the digitizer communication protocols are further configured to revert communication over the wireless connection from the dedicated uplink communication protocol to the multiuse communication protocol based at least in part on satisfaction of an upload completion condition.

Another example system of any preceding system is provided, wherein the upload completion condition is based at least in part on a confirmation by the peripheral input device that the cumulative upload is complete.

Another example system of any preceding system is provided wherein the cumulative upload includes an update to firmware of the peripheral input device.

Another example system of any preceding system is provided, wherein the digitizer is further configured to transmit to the peripheral input device a signal indicating the dedicated uplink communication protocol is active while the communication is conducted by the dedicated uplink communication protocol.

Another example system of any preceding system is provided, wherein the digitizer is an element of one or more of a display and a trackpad communicatively coupled to the computing device.

One or more example tangible processor-readable storage media embodied with instructions for executing on one or more processors and circuits of a computing device a process for wireless uplink transmission from the computing device to a peripheral input device is provided. The process includes communicating over a wireless connection between a digitizer of the computing device and the peripheral input device by a multiuse communication protocol in which the digitizer is configured to receive user input from the peripheral input device to affect operation of the computing device, transitioning communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and transmitting, while communicating by the dedicated uplink communication protocol, multiple consecutive data uplink blocks representing a cumulative upload from the digitizer to the peripheral input device before the digitizer accepts a downlink communication from the peripheral input device.

One or more other example tangible processor-readable storage media of any preceding media is provided, the process further including reverting communication by the digitizer over the wireless connection from the dedicated uplink communication protocol to the multiuse communication protocol based at least in part on satisfaction of an upload completion condition.

One or more other example tangible processor-readable storage media of any preceding media is provided, wherein the upload completion condition is based at least in part on a confirmation by the peripheral input device that the cumulative upload is complete.

One or more other example tangible processor-readable storage media of any preceding media is provided, wherein the cumulative upload includes an update to firmware of the peripheral input device.

One or more other example tangible processor-readable storage media of any preceding media is provided, wherein the operation of transmitting includes multicasting the multiple consecutive data uplink blocks to the peripheral input device and at least one other peripheral input device.

One or more other example tangible processor-readable storage media of any preceding media is provided, wherein the digitizer is an element of one or more of a display and a trackpad communicatively coupled to the computing device.

An example system for wireless uplink transmission from a computing device to a peripheral input device is provided. The system includes means for communicating over a wireless connection between a digitizer of the computing device and the peripheral input device by a multiuse communication protocol in which the digitizer is configured to receive input from the peripheral input device to affect operation of the computing device, means for transitioning communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and means for transmitting, while communicating by the dedicated uplink communication protocol, multiple consecutive data uplink blocks representing a cumulative upload from the digitizer to the peripheral input device before the digitizer accepts a downlink communication from the peripheral input device.

Another example system of any preceding system is provided, the system further including means for reverting communication by the digitizer over the wireless connection from the dedicated uplink communication protocol to the multiuse communication protocol based at least in part on satisfaction of an upload completion condition.

Another example system of any preceding system is provided, wherein the upload completion condition is based at least in part on a confirmation by the peripheral input device that the cumulative upload is complete.

Another example system of any preceding system is provided, wherein the cumulative upload includes an update to firmware of the peripheral input device.

Another example system of any preceding system is provided, wherein the means for transmitting includes means for multicasting the multiple consecutive data uplink blocks to the peripheral input device and at least one other peripheral input device.

Another example system of any preceding system is provided, the system further including means for transmitting, by the digitizer to the peripheral input device, a signal indicating the dedicated uplink communication protocol is active, while communication is conducted by the dedicated uplink communication protocol.

Another example system of any preceding system is provided, wherein the digitizer is an element of one or more of a display and a trackpad communicatively coupled to the computing device.

Another example system of any preceding system is provided, wherein the peripheral input device is one or more of a digital pen and a remote controller.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together into a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method for controlling a digital inking device, the method comprising:
   communicating electrostatic inking signals between the digital inking device and an ink-receiving computing device in an inking mode, the inking mode enabling the digital inking device to render digital ink in a display of the ink-receiving computing device via the electrostatic inking signals;
   detecting proximity of a peripheral communication device relative to the digital inking device;
   transitioning the digital inking device from the inking mode to a non-inking mode that terminates communication of the electrostatic inking signals between the digital inking device and the ink-receiving computing device, based at least in part on the detecting operation; and
   communicating electrostatic data signals in the non-inking mode between the digital inking device and the peripheral communication device in the non-inking mode, based at least in part on transitioning to the non-inking mode.

2. The method of claim 1, wherein the detecting operation is based at least in part on the digital inking device being in the inking mode.

3. The method of claim 1, wherein the ink-receiving computing device is communicatively coupled with the peripheral communication device, the method further comprising:
   communicating data represented in the electrostatic data signals between the ink-receiving computing device and the digital inking device via the peripheral communication device.

4. The method of claim 1, wherein the communicated electrostatic data signal includes telemetry data from the digital inking device communicated to the peripheral communication device.

5. The method of claim 1, wherein the communicated electrostatic data signal includes update data to update firmware of the digital inking device communicated to the digital inking device.

6. The method of claim 1, wherein the communicated electrostatic data signal includes a pen status of the digital inking device communicated to the peripheral communication device.

7. The method of claim 1, wherein the electrostatic inking signal communication and the electrostatic data signal communication are conducted via an electrostatic antenna in the digital inking device.

8. A system for controlling a digital inking device, the system comprising:
   one or more hardware processors;
   an electrostatic digital inking device communication interface executable by the one or more hardware processors and configured to communicate electrostatic inking signals between the digital inking device and an ink-receiving computing device in an inking mode, the inking mode enabling the digital inking device to render digital ink in a display of the ink-receiving computing device via the electrostatic inking signals;
   a proximity detector configured to detect proximity of a peripheral communication device relative to the digital inking device; and
   an ink-mode controller executable by the one or more hardware processors and configured to transition the digital inking device from the inking mode to a non-inking mode that terminates communication of the electrostatic inking signals between the digital inking device and the ink-receiving computing device, based at least in part on the detected proximity, wherein the electrostatic digital inking device communication interface is further configured to communicate electrostatic data signals in the non-inking mode between the digital inking device and the peripheral communication device in the non-inking mode, based at least in part on transitioning to the non-inking mode.

9. The system of claim 8, wherein the proximity detector detects the proximity based at least in part on the digital inking device being in the inking mode.

10. The system of claim 8, wherein data represented by the electrostatic data signals is communicated between the ink-receiving computing device and the digital inking device via the peripheral communication device.

11. The system of claim 8, wherein the communicated electrostatic data signal includes telemetry data from the digital inking device communicated to the peripheral communication device.

12. The system of claim 8, wherein the communicated electrostatic data signal includes update data to update firmware of the digital inking device communicated to the digital inking device.

13. The system of claim 8, wherein the communicated electrostatic data signal includes a pen status of the digital inking device communicated to the peripheral communication device.

14. The system of claim 8, the electrostatic digital inking device communication interface further comprising:
    an electrostatic antenna, wherein the electrostatic inking signal communication and the electrostatic data signal communication are conducted via the electrostatic antenna.

15. One or more tangible processor-readable storage media embodied with instructions for executing on one or more processors and circuits of a computing device a process for controlling a digital inking device, the process comprising:
    communicating electrostatic inking signals between the digital inking device and an ink-receiving computing device in an inking mode, the inking mode enabling the digital inking device to render digital ink in a display of the ink-receiving computing device via the electrostatic inking signals;
    detecting proximity of a peripheral communication device relative to the digital inking device;
    transitioning the digital inking device from the inking mode to a non-inking mode that terminates communication of the electrostatic inking signals between the digital inking device and the ink-receiving computing device, based at least in part on the detecting operation; and
    communicating electrostatic data signals in the non-inking mode between the digital inking device and the peripheral communication device in the non-inking mode, based at least in part on transitioning to the non-inking mode.

16. The one or more tangible processor-readable storage media of claim 15, wherein the detecting operation is based at least in part on the digital inking device being in the inking mode.

17. The one or more tangible processor-readable storage media of claim 15, wherein the ink-receiving computing device is communicatively coupled with the peripheral communication device, the process further comprising:
    communicating data represented in the electrostatic data signals between the ink-receiving computing device and the digital inking device via the peripheral communication device.

18. The one or more tangible processor-readable storage media of claim 15, wherein the communicated electrostatic data signal includes telemetry data from the digital inking device communicated to the peripheral communication device.

19. The one or more tangible processor-readable storage media of claim 15, wherein the communicated electrostatic data signal includes update data to update firmware of the digital inking device communicated to the digital inking device.

20. The one or more tangible processor-readable storage media of claim 15, wherein the communicated electrostatic data signal includes a pen status of the digital inking device communicated to the peripheral communication device.

\* \* \* \* \*